United States Patent
Tsuji et al.

(10) Patent No.: US 7,558,956 B2
(45) Date of Patent: Jul. 7, 2009

(54) COMMUNICATIONS DEVICE AND COMMUNICATIONS PROGRAM

(75) Inventors: Atsuhiro Tsuji, Minoh (JP); Yukie Gotoh, Hirakata (JP); Keiichi Takagaki, Osaka (JP); Chuan-Fen Chiu, Taipei (TW)

(73) Assignee: Panasonic Corporation, Osaka (JP)

( * ) Notice: Subject to any disclaimer, the term of this patent is extended or adjusted under 35 U.S.C. 154(b) by 910 days.

(21) Appl. No.: 11/049,686

(22) Filed: Feb. 4, 2005

(65) Prior Publication Data

US 2005/0185644 A1 Aug. 25, 2005

(30) Foreign Application Priority Data

Feb. 6, 2004 (JP) .............................. 2004-030320

(51) Int. Cl.
*H04L 9/00* (2006.01)
*H04K 1/00* (2006.01)
(52) U.S. Cl. ....................................... 713/168; 380/277
(58) Field of Classification Search ................. 380/277, 380/282; 713/201, 170, 168, 175, 171; 726/1
See application file for complete search history.

(56) References Cited

U.S. PATENT DOCUMENTS

| | | | | |
|---|---|---|---|---|
| 6,842,860 | B1 * | 1/2005 | Branstad et al. ............. | 713/170 |
| 6,845,449 | B1 * | 1/2005 | Carman et al. .............. | 713/170 |
| 6,915,426 | B1 * | 7/2005 | Carman et al. .............. | 713/168 |
| 6,915,437 | B2 * | 7/2005 | Swander et al. ................ | 726/1 |
| 6,976,168 | B1 * | 12/2005 | Branstad et al. ............. | 713/175 |
| 7,228,421 | B1 * | 6/2007 | Huang et al. ................. | 713/171 |
| 2003/0142823 | A1 * | 7/2003 | Swander et al. ............. | 380/277 |
| 2003/0237003 | A1 * | 12/2003 | Rautiainen et al. .......... | 713/201 |
| 2004/0225895 | A1 * | 11/2004 | Mukherjee et al. .......... | 713/201 |
| 2005/0058295 | A1 * | 3/2005 | Kang .......................... | 380/282 |
| 2005/0091527 | A1 * | 4/2005 | Swander et al. ............. | 713/201 |

FOREIGN PATENT DOCUMENTS

| | | |
|---|---|---|
| JP | 2002-344443 | 11/2002 |
| JP | 2003-338850 | 11/2003 |
| JP | 2005-20215 | 1/2005 |

OTHER PUBLICATIONS

Jürgen Vogel; RTP/I Payload Type Definition for Telepointers; Sep. 2001; University at Mannheim; pp. 1-8.*

* cited by examiner

*Primary Examiner*—Andrew L Nalven
*Assistant Examiner*—Monjour Rahim
(74) *Attorney, Agent, or Firm*—Wenderoth, Lind & Ponack, L.L.P.

(57) ABSTRACT

A transmitting side communications device transmits a Delete Payload of an IPsec SA using an ISAKMP SA that satisfies a transmission condition, and more preferably using all ISAKMP SAs that exist between communications devices. The receiving side communications device accepts a Delete Payload by an ISAKMP SA that satisfies a reception condition, and preferably any ISAKMP SA that exists between the communications devices. As long as there exists an IPsec SA that was established using the ISAKMP SA, it remains possible to maintain an ISAKMP SA, without completely deleting it, and to transmit and receive a Delete Payload by that ISAKMP SA.

21 Claims, 13 Drawing Sheets

| ISAKMP SA ID | ISAKMP SA LIFETIME | ISAKMP SA STATUS | IPsec SA ID | IPsec SA LIFETIME | VENDER ID | OTHER PARTY COMM. DEVICE |
|---|---|---|---|---|---|---|
| KMP1 | 12/15/2004 12:00 | ESTABLISHMENT COMPLETED | Key1 | 12/15/2004 9:00 | Vender1 | 192.168.1.0 |
| ″ | ″ | ″ | Key2 | 12/16/2004 24:00 | Vender2 | 192.168.1.1 |
| KMP2 | 12/14/2004 24:00 | NEW IPsec SA CANNOT BE ESTABLISHED | Key3 | 12/25/2004 24:00 | Vender3 | 192.168.0.0 |
| ... | ... | ... | ... | ... | ... | ... |

| VENDER ID | RECEPTION CONDITION OF DELETE PAYLOAD |
|---|---|
| Vender1 | RECEIVE BY LATEST ISAKMP SA |
| Vender2 | RECEIVE BY THE ISAKMP SA THAT ESTABLISHED THE IPsec SA |
| ⋮ | ⋮ |

COMMUNICATIONS DEVICE AND COMMUNICATIONS PROGRAM

BACKGROUND OF THE INVENTION

1. Field of the Invention

The present invention relates to a communications device that performs encrypted communications. More particularly, the present invention relates to a communications device used in an environment, such as a home network, to perform automatic key exchange.

2. Background Information

RFC 2401 through RFC 2412 (RFC: Request for Comments) formulated by the IETF (Internet Engineering Task Force) stipulate the IP security (IPsec) protocol and the IKE (Internet Key Exchange) key exchange protocol. IPsec is a protocol within IP (Internet Protocol) that authenticates encrypted communications and IP packets. Unless otherwise noted below, the term "encrypted communications" does not exclude functions which authenticate communications data.

Communications gateways and communications terminals (hereinbelow, collectively referred to as communications devices) having built-in encryption functions based on IPsec perform encrypted communications over a logical communications path called a security association (SA). In a security association, the key data (encryption key and authentication key) used by the encrypted communications, the applicable encryption algorithm data, the authentication algorithm data, and the like, are managed. In particular, the security association (encrypted communications path) used by IPsec based encrypted communications is called an IPsec SA.

An example of a method that establishes an IPsec SA between communications devices performing encrypted communications is manual key setting, in which various IPsec SA data is manually set in both communication devices. In addition, there is also automatic key exchange (IKE), wherein both communication devices mutually confirm whether the other can properly perform encrypted communications, and then both negotiate and determine various IPsec SA data to establish an IPsec SA. IKE is particularly defined in RFC 2407 through RFC 2409. In IKE, negotiation is performed to establish an IPsec SA. A control communications path for performing this negotiation is called an ISAKMP SA. This ISAKMP SA is not only for establishing the IPsec SA, but is also used for updating the IPsec SA and deleting the IPsec SA data. Furthermore, ISAKMP is an abbreviation for Internet Security Association and Key Management Protocol, which is the title that stipulates the IKE communications protocol.

FIG. 12 depicts an example of a network configuration that applies an encrypted communications system. In the encrypted communications system of FIG. 12, a terminal 101, for example, communicates with a terminal 103 via a gateway 111, a communications network 121, and a gateway 112. An example of an embodiment that performs encrypted communications is one that establishes a comprehensive encrypted communications path (security association, hereinafter referred to as SA) between two parties of the gateway 111 and the gateway 112, and encrypts communications via both parties between both gateways. In addition, there is another embodiment that performs encrypted communications by establishing a direct SA between two parties among terminals 101-104. Furthermore, there is an embodiment that combines the former and the latter, wherein, for example, if the terminal 101 communicates with the terminal 103, then encrypted communications is performed by establishing an SA between the terminal 101 and the gateway 112. Hereinafter, gateways and terminals that establish an SA are simply referred to as communications devices.

FIG. 13 is an explanatory diagram that depicts the state of an SA for performing encrypted communications (IPsec communications) based on IPsec using IKE between the communications devices. A communications device 201 in FIG. 13 is one of the terminals 101-102 or the gateway 111 in FIG. 12. A communications device 202 is one of the terminals 103-104 or the gateway 112 in FIG. 12. In FIG. 13, an ISAKMP SA 211 is used for the establishment, updating, and disconnection of an IPsec SA 212. Furthermore, in IPsec communications, SA data is managed by the direction of that communication. If IKE is used, then there are two types of SA data managed by each communications device for establishing the IPsec SA that implements bidirectional communications: for input and for output. However, bidirectional communications is presupposed herein, and these are illustrated as one bundled IPsec SA.

IKE uses IP packet communication, which uses a message format called an ISAKMP message to establish the ISAKMP SA and to establish the IPsec SA. To establish an ISAKMP SA, there is, for example, a negotiating means (transaction) called Main Mode. To establish an IPsec SA, there is, for example, a negotiating means called Quick Mode. Basically, the negotiating means for updating an IPsec SA and an ISAKMP SA are similar to the establishment negotiating means. In addition, IKE stipulates an ISAKMP message for the purpose of notifying the various types of data outside of the negotiating means for establishing an SA. Among these, Delete and Notify messages are also defined for ISAKMP SAs and IPsec SAs.

Encrypted communications are principally used for assuring the confidentiality and integrity of communicated data, but a key is needed for encryption and decryption. If this key is made known to a third party, then the third party can easily decrypt that encrypted data. Consequently, the management of the key is important. A key can be inferred from the encrypted data if time and effort are applied; furthermore, it becomes all the more easier to infer the key if a large amount of data encrypted using that key is collected. Consequently, a mechanism is provided in IKE to newly establish an IPsec SA principally for updating key data. This is called IPsec SA updating. An IPsec SA lifetime is determined when establishing an IPsec SA, and the IPsec SA is updated according to that lifetime. Examples of the timing of IPsec SA updating include a method that performs updating after the IPsec SA lifetime has expired, and a method that performs updating at a predetermined timing prior to the expiration of the lifetime. The latter method is superior for the continuity of encrypted communications, and is the more commonplace method. An ISAKMP SA that is the control communications path is needed to update an IPsec SA. FIG. 14 depicts a situation in which a new IPsec SA is established for updating by a method that performs updating prior to the expiration of the lifetime. An IPsec SA 311 is the IPsec SA newly established for updating.

The disconnection of an IPsec SA occurs principally by the expiration of its lifetime. In FIG. 14, the IPsec SA 212 is in a state in which it has already been updated by the IPsec SA 311, and its lifetime is about to run out. When the lifetime runs out, the IPsec SA 212 is disconnected, and its old IPsec SA data is deleted from the communications devices 201, 202. It is preferable that the lifetime length be determined by the algorithm that uses that key, the purpose of the encrypted communications, and the like; nonetheless, there is also a mode that uses a predetermined value. Another method that disconnects the IPsec SA is one that deletes the IPsec SA data in one communications device, and also deletes the corresponding IPsec SA data in the other communications device by notifying this other communications device of that deletion. This method is useful if the application that operates one communications device, or its user, expressly instructs disconnection. An ISAKMP SA is generally used to transmit and receive an IPsec SA Delete Notify. Note that a Delete Notify is defined as a Notify message (Informational Exchange), which includes a Delete Payload, in the ISAKMP message.

However, the ISAKMP SA also carries out communication of encrypted data, and has its own lifetime. Accordingly, the IPsec SA cannot be established, updated, or disconnected unless the ISAKMP SA is updated. However, in the abovementioned RFC, a method of maintaining the ISAKMP SA is not strictly defined, and a plurality of implementation methods are conceivable. For example, there is a method that also updates the ISAKMP SA, and there is a method that establishes a new ISAKMP SA when it becomes necessary without updating the ISAKMP SA. Furthermore, if there is also an implementation method for transmitting and receiving the Delete Notify that requests the usage of the ISAKMP SA that was used to establish the IPsec SA to be deleted, then there is also an implementation method that, if there is a plurality of ISAKMP SAs, always uses the newest ISAKMP SA.

In IPsec based encrypted communications, encrypted communications is achieved by the communications devices retaining SA data related to the IPsec SA, as discussed above. Incidentally, a situation may arise in which only one of the communications devices has the SA data, but the corresponding SA data does not exist in the other communications device, i.e., a state in which there is an inconsistency in the IPsec SA. In this situation, an attempt is made to carry out encrypted communications from the communications device retaining the SA data by using the already retained SA data of the IPsec SA, and the corresponding packet is thereby encrypted and transmitted. In contrast, because the corresponding IPsec SA is retained by the other communications device, this packet is unfortunately discarded, and encrypted communications is not established. To recover from this communications failure state, it is necessary to undergo a procedure, such as: 1) delete the IPsec SA retained by one of the communications devices; 2) the application expressly instructs IKE to establish a new IPsec SA; and 3) the lifetime of the IPsec SA runs out.

In relation to this type of problem, consider a situation in which the two communications devices are gateways, and communications is carried out between two terminals via two gateways. In this situation, if the IP address of one of the gateways is modified, then, attendant with that modification, an inconsistency arises in the ISAKMP SA and the EPsec SA data. To resolve this inconsistency, Japanese Published Patent Application No. 2002-344443 therefore proposes a method that includes the following three steps:

1) transmit an ISAKMP SA Delete Notify to the other gateway,
2) the other gateway that receives that Delete Notify disconnects the IPsec SA previously established by the ISAKMP SA to be disconnected, and
3) subsequently, establish a new ISAKMP SA and an IPsec SA between the gateways.

With this method, in situations where the IP address has been modified by a power supply restart and the like, an ISAKMP SA Delete Notify is transmitted to the other gateway using a premodification identifier, e.g., the IP address before the modification.

However, in the method recited in Japanese Published Patent Application No. 2002-344443, there is a problem in that the inconsistency of the IPsec SA that arises cannot be resolved if the IPsec SA has been expressly disconnected in one communications device because it is operating in the event of a power supply restart or an IP address modification.

Furthermore, if encrypted communications is achieved between communications devices, then there is a portion that is implementation dependent in the method that retains the ISAKMP SA, as discussed above. Consequently, if encrypted communications is attempted using IKE between communications devices having mutually different implementation modes, then an IPsec SA Delete Notify is not necessarily transmitted under conditions in which the other communication device receives it correctly. The result is that IPsec SA disconnect processing cannot necessarily be performed reliably, and it is possible that an inconsistency in an IPsec SA will arise.

In such a situation, IPsec SA establishment can be performed again by making the IPsec SA in which an inconsistency has arisen have a lifetime that expires. In addition, IPsec SA establishment can be performed again by confirming that encrypted communications has not been established after the application or its user has waited a prescribed interval of time, and then expressly deleting the retained IPsec SA. However, in either situation, there is a problem in that time is needed from when IPsec SA disconnect processing is performed incompletely until IPsec SA establishment restarts.

The present invention solves the aforementioned problems, and provides a technology that, with the various types of implementation modes for maintaining an ISAKMP SA, prevents the arising of an inconsistent state in an IPsec SA by reliably transmitting and receiving an IPsec SA Delete Notify mutually between communications devices.

SUMMARY OF THE INVENTION

To solve the abovementioned problems, a first aspect of the present invention provides a communications device that performs encrypted communications by establishing, based on IPsec (IP security protocol) and IKE (Internet Key Exchange), an ISAKMP (Internet Security Association and Key Management Protocol) SA (Security Association) and an IPsec SA. This device comprises the following:

a managing unit that stores an identifier of another communications device with which encrypted communications occurs; an identifier of an IPsec SA established with the other communications device; and an identifier of an ISAKMP SA established with the other communications device;

a judging unit that, from among ISAKMP SAs whose identifiers are stored by the managing unit, specifies one or a plurality of ISAKMP SAs established with the other communications device and that satisfies an IPsec SA Delete Payload transmission condition stored by the managing unit;

a transmitting unit that uses one or a plurality of ISAKMP SAs specified by the judging unit to transmit a Delete Payload of the IPsec SA; and a deleting unit that deletes from the managing unit the identifier of the IPsec SA to be deleted by the Delete Payload.

An example of a transmission condition to transmit the Delete Payload of the IPsec SA is "all ISAKMP SAs established with the other communications device for which that IPsec SA is established." Using this transmission condition enables the transmission of the Delete Payload of the IPsec SA using at least one ISAKMP SA, even if a reception condition of the Delete Payload of the other communications device is "receive a Delete Payload by the ISAKMP SA that was used to establish the IPsec SA," or even if it is "receive a Delete Payload by the latest ISAKMP SA in an establishment completed state."

Here, not only does the ISAKMP SA established with the other communications device exist with the other communications device, but it is an ISAKMP SA whose lifetime has not run out. A lifetime that has not run out is a namely a state in which a new IPsec SA can be established.

Furthermore, if there does not exist an ISAKMP SA to transmit the Delete Payload to the other communications device, then it is preferable to reestablish a new ISAKMP SA. This is because the Delete Payload of the IPsec SA can be transmitted using that ISAKMP SA.

A second aspect of the present invention provides the communications device as recited in the first aspect, further comprising a condition managing unit that associates prescribed data that identifies the other communications device's characteristics stored in the managing unit with the IPsec SA Delete Payload transmission condition, and that stores them. In this device, the managing unit associates prescribed data that identifies the characteristics of the other communications device with the identifier of the other communications device, and further stores them. In addition, the judging unit reads out from the condition managing unit the transmission condition associated with the prescribed data corresponding to the other communications device for which the IPsec SA is established, and specifies one or a plurality of ISAKMP SAs that meets the read out transmission condition.

By selecting an ISAKMP SA in accordance with the other communications device for use in transmitting the Delete Payload of the IPsec SA, the Delete Payload can be efficiently transmitted.

In a third aspect of the present invention, as recited in the first aspect, the prescribed data that identifies the characteristics of the other communications device is an identifier of the manufacturer of the other communications device. The condition managing unit associates the identifier of the manufacturer with the transmission condition by manufacturer, and stores them. The judging unit reads out from the condition managing unit the transmission condition associated with the identifier of the manufacturer corresponding to the IPsec SA, and specifies one or a plurality of ISAKMP SAs that meets the read out transmission condition.

One specific method to change the transmission condition in accordance with the other communications device is to store in advance the reception condition in accordance with the manufacturer of the other communications device. If the identifier of the manufacturer of the other communications device is acquired when establishing an IPsec SA, then the Delete Payload of the IPsec SA can be transmitted suited to a reception condition that varies by manufacturer. Thereby, the transmission of wasteful Delete Payloads can be eliminated, thereby enabling the efficient and reliable transmission and reception of Delete Payloads.

A fourth aspect of the present invention provides the communications device as recited in the first aspect, wherein the managing unit further stores the association between the ISAKMP SA and the IPsec SA established by that ISAKMP SA. Here, the judging unit judges whether there is an IPsec SA that is another IPsec SA outside of the IPsec SA to be deleted by the Delete Payload, and that is established by the ISAKMP SA used to establish the IPsec SA to be deleted. In this device, the deleting unit deletes from the managing unit the identifier of the ISAKMP SA if the judging unit has judged that there is no other IPsec SA established by the ISAKMP SA.

Even after a certain IPsec SA has been deleted, there are situations in which it is better not to delete the ISAKMP SA that was used to establish that IPsec SA. That situation is when another IPsec SA is established by that ISAKMP SA. In that situation, if the ISAKMP SA is unfortunately deleted, then there is a risk that the implementation mode of the communications device will hinder the transmission of a Delete Payload of another IPsec SA. Moreover, the communications device of the implementation mode that will transmit the Delete Payload using the ISAKMP SA that was used to establish the IPsec SA will unfortunately no longer be able to transmit the Delete Payload. Therefore, if another IPsec SA is established, it is preferable to not delete that ISAKMP SA.

In addition, the same applies also for a situation in which the Delete Payload of an ISAKMP SA has been transmitted. Namely, as long as there is an IPsec SA established by that ISAKMP SA, it is preferable to not delete that ISAKMP SA.

Furthermore, the same applies also when the ISAKMP SA expiration time has expired. Namely, even if the ISAKMP SA expiration time has expired, there is a possibility, if there exists an IPsec SA that was established using that ISAKMP SA, that that ISAKMP SA will be needed to transmit that Delete Payload. Therefore, that ISAKMP SA is reserved even if its expiration time has expired. However, its status is set to "cannot establish new IPsec SA" to prevent the further establishment of new IPsec SAs by an ISAKMP SA whose expiration time has been exceeded. That is because it is sufficient if an IPsec SA already established using that ISAKMP SA can be deleted.

A fifth aspect of the present invention provides the communications device as recited in the fourth aspect, wherein the managing unit associates the IPsec SA expiration time with the IPsec SA identifier, and further stores them. In this device, the judging unit further monitors whether there is an IPsec SA, whose identifier is stored in the managing unit, that has exceeded its expiration time, and, if there is an IPsec SA whose expiration time has been exceeded, then judges whether there is another IPsec SA established by the ISAKMP SA used to establish that IPsec SA. In addition, the deleting unit deletes from the managing unit the identifier of the ISAKMP SA if the judging unit has judged that there is no other IPsec SA established by the ISAKMP SA.

There are situations in which the ISAKMP SA that was used to establish that IPsec SA is deleted when the IPsec SA expiration time has been exceeded. However, that is when there is no other IPsec SA established by that ISAKMP SA. That ISAKMP SA can be prepared, if needed, to transmit the Delete Payload of another IPsec SA established by that ISAKMP SA, thus further facilitating the prevention of a contradiction in the IPsec SA among the communications devices. Moreover, if the other communications device has an implementation mode that accepts the Delete Payload of the IPsec SA transmitted by the ISAKMP SA that was used to establish the IPsec SA, it facilitates the prevention of the occurrence of an inconsistency in the IPsec SA on both sides.

A sixth aspect of the present invention provides the communications device as recited in the fourth aspect or the fifth aspect, wherein the managing unit further stores the ISAKMP SA expiration time associated with the identifier of the ISAKMP SA. In this device, the judging unit judges whether there is no other IPsec SA established by the ISAKMP SA and whether the ISAKMP SA expiration time has been exceeded. In addition, if there is no other IPsec SA established by the ISAKMP SA and the judging unit judges that the expiration time of the ISAKMP SA has been exceeded, then the deleting unit deletes from the managing unit the identifier of the ISAKMP SA.

There are situations in which, when the lifetime of an IPsec SA has run out, the ISAKMP SA that was used to establish that IPsec SA is deleted. However, that is a situation in which there does not exist another IPsec SA that was established by that ISAKMP SA and that ISAKMP SA expiration time has been exceeded. Accordingly, even if the IPsec SA expiration time is longer than the ISAKMP SA expiration time, the Delete Payload of that IPsec SA can be transmitted using the ISAKMP SA that was used to establish that IPsec SA.

A seventh aspect of the present invention provides the communications device as recited in the fourth aspect, wherein the judging unit judges whether an ISAKMP SA other than the ISAKMP SA to be deleted is established with the other communications device. This device further comprises a reestablishing unit that establishes a new ISAKMP SA in accordance with the judgment results of the judging unit.

There are situations in which, if an ISAKMP SA is to be deleted in accordance with the deletion of an IPsec SA, there will no longer be an ISAKMP SA established with the other communications device. Even in these situations, it is conceivable that another IPsec SA exists with that other communications device. Therefore, it is preferable to newly establish in advance an ISAKMP SA having the possibility of being used to transmit the Delete Payload of that other IPsec SA. In addition, if a new ISAKMP SA is established in advance, then using it has the advantage of facilitating the establishment of a new IPsec SA as needed.

This applies also to deleting an ISAKMP SA based on the transmission and reception of a Delete Payload of an ISAKMP SA.

An eighth aspect of the present invention provides the communications device as recited in the seventh aspect, wherein prior to transmitting the IPsec SA Delete Payload by the transmitting unit or in response to the transmission of the Delete Payload by the transmitting unit, the reestablishing unit judges whether an ISAKMP SA other than the ISAKMP SA is established with the other communications device, and establishes a new ISAKMP SA in accordance with the judgment results.

The ISAKMP SA needed to transmit the IPsec SA can be generated as needed.

A ninth aspect of the present invention provides a communications method executed by a communications device that performs encrypted communications by establishing, based on IPsec (IP security protocol) and IKE (Internet Key Exchange), an ISAKMP (Internet Security Association and Key Management Protocol) SA (Security Association) and an IPsec SA. This method comprises the following steps:

a storing step that stores an identifier of another communications device with which encrypted communications is performed; an identifier of an IPsec SA established with that other communications device; and an identifier of an ISAKMP SA established with that other communications device;

a judging step that specifies, from among ISAKMP SAs whose identifiers are stored by the storing step, one or a plurality of ISAKMP SAs established with the other communications device and that satisfies the IPsec SA Delete Payload transmission condition stored by the storing step;

a transmitting step that uses one or a plurality of ISAKMP SAs specified by the judging step to transmit a Delete Payload of the IPsec SA; and a deleting step that deletes from the storage object of the storing step the identifier of the IPsec SA to be deleted by the Delete Payload.

This method accomplishes the same operational effects as the first aspect.

A tenth aspect of the present invention provides a communications device that performs encrypted communications by establishing, based on IPsec (IP security protocol) and IKE (Internet Key Exchange), an ISAKMP (Internet Security Association and Key Management Protocol) SA (Security Association) and an IPsec SA. This device comprises the following:

a managing unit that stores an identifier of another communications device which encrypted communications is performed; an identifier of an IPsec SA established with that other communications device; and an identifier of an ISAKMP SA established with that other communications device;

a receiving unit that receives a Delete Payload of the IPsec SA from the other communications device using an arbitrary ISAKMP SA;

a judging unit that judges whether the ISAKMP SA satisfies the reception condition of the Delete Payload of the IPsec SA; and a deleting unit that, if the judging unit judges that the reception condition is satisfied, deletes the IPsec SA identifier from the managing unit.

An example of a reception condition to receive the Delete Payload of the IPsec SA is "receive a Delete Payload by any ISAKMP SA established with the other terminal for which that IPsec SA is established." Using this reception condition enables the reception of the Delete Payload of the IPsec SA using at least one ISAKMP SA, even if a reception condition of the Delete Payload of the other communications device is "receive a Delete Payload by the ISAKMP SA that was used to establish the IPsec SA," or even if it is "transmit a Delete Payload by the latest ISAKMP SA in an establishment completed state."

Furthermore, if there does not exist an ISAKMP SA to receive the Delete Payload from the other communications device, then it is acceptable to reestablish a new ISAKMP SA. This is because the Delete Payload of the IPsec SA can be received using that ISAKMP SA.

An eleventh aspect of the present invention provides the communications device as recited in the tenth aspect, further comprising a condition managing unit that associates prescribed data that identifies the other communications device's characteristics stored in the managing unit with the IPsec SA Delete Payload reception condition, and that stores them. In this device, the managing unit associates prescribed data that identifies the characteristics of the other communications device with the identifier of the other communications device, and further stores them. In addition, the judging unit reads out from the condition managing unit the reception condition associated with the prescribed data corresponding to the other communications device for which the IPsec SA is established, and judges whether the ISAKMP SA used to receive the Delete Payload satisfies the read out reception condition.

Storing the reception condition in accordance with the IPsec SA is namely the storage of the reception condition in accordance with the other communications device. Selecting, in accordance with the other communications device, an ISAKMP SA for use in receiving the Delete Payload of the IPsec SA enables the safe deletion of the IPsec SA based on the Delete Payload.

A twelfth aspect of the present invention provides the communications device as recited in the tenth aspect, wherein prescribed data that identifies the characteristics of the other communications device is an identifier of the manufacturer of the other communications device. In this device, the condition managing unit associates the identifier of the manufacturer with the reception condition by manufacturer, and stores them. In addition, the judging unit reads out from the condition managing unit the reception condition associated with the identifier of the manufacturer corresponding to the IPsec SA, and judges whether the ISAKMP SA that was used to receive the Delete Payload satisfies the read out reception condition.

One specific method to change the reception condition in accordance with the other communications device is for the communications device to store in advance the reception condition in accordance with the manufacturer of the other communications device. If the identifier of the manufacturer of the other communications device is acquired when establishing an IPsec SA, then the Delete Payload of the IPsec SA can be transmitted suited to an implementation mode that varies by manufacturer. Thereby, the deletion of an IPsec SA based on an improper Delete Payload can be prevented, and an IPsec SA can be safely and reliably deleted.

A thirteenth aspect of the present invention provides the communications device as recited in the tenth aspect, wherein the managing unit further stores the association between the ISAKMP SA and the IPsec SA established by that ISAKMP SA. The judging unit judges whether there is an IPsec SA that is another IPsec SA outside of the IPsec SA to be deleted by the Delete Payload, and that is established by the ISAKMP SA used to establish the IPsec SA to be deleted. In this device, the deleting unit deletes from the managing unit the identifier of the ISAKMP SA if the judging unit has judged that there is no other IPsec SA established by the ISAKMP SA.

Even after a certain IPsec SA has been deleted, there are situations in which it is better not to delete the ISAKMP SA that was used to establish that IPsec SA. That situation is when another IPsec SA is established by that ISAKMP SA. In that situation, if the ISAKMP SA is unfortunately deleted, then there is a risk that the implementation mode of the communications device will hinder the reception of a Delete Payload of another IPsec SA. Moreover, the communications device of the implementation mode that will accept the Delete Payload transmitted by the ISAKMP SA that was used to establish the IPsec SA will unfortunately no longer be able to receive the Delete Payload. Therefore, if another IPsec SA is established, it is preferable to not delete that ISAKMP SA.

In addition, the same applies also for a situation in which the Delete Payload of an ISAKMP SA has been received. Namely, as long as there is an IPsec SA established by that ISAKMP SA, it is preferable to not delete that ISAKMP SA.

Furthermore, the same applies also when the ISAKMP SA expiration time has expired. Namely, even if the ISAKMP SA expiration time has expired, there is a possibility, if there exists an IPsec SA that was established using that ISAKMP SA, that that ISAKMP SA will be needed to receive that Delete Payload. Therefore, that ISAKMP SA is reserved even if its expiration time has expired. However, its status is set to "cannot establish new IPsec SA" to prevent the further establishment of new IPsec SAs by an ISAKMP SA whose expiration time has been exceeded. That is because it is sufficient if an IPsec SA already established using that ISAKMP SA can be deleted.

A fourteenth aspect of the present invention provides the communications device as recited in the thirteenth aspect, wherein the managing unit associates the IPsec SA expiration time with the IPsec SA identifier, and further stores them. In this device, the judging unit further monitors whether there is an IPsec SA, whose identifier is stored in the managing unit, that has exceeded its expiration time, and, if there is an IPsec SA whose expiration time has been exceeded, then judges whether there is another IPsec SA established by the ISAKMP SA used to establish that IPsec SA. In addition, the deleting unit deletes from the managing unit the identifier of the ISAKMP SA if the judging unit has judged that there is no other IPsec SA established by the ISAKMP SA.

There are situations in which the ISAKMP SA that was used to establish that IPsec SA is deleted when the IPsec SA expiration time has been exceeded. However, that is a situation in which there is no other IPsec SA established by that ISAKMP SA. That ISAKMP SA can be prepared, if needed, to receive the Delete Payload of another IPsec SA established by that ISAKMP SA, thus further facilitating the prevention of a contradiction in the IPsec SA among the communications devices. Moreover, if the other communications device has an implementation mode that receives in advance the Delete Payload of the IPsec SA by the ISAKMP SA that was used to establish the IPsec SA, it facilitates the prevention of the occurrence of an inconsistency in the IPsec SA on both sides.

A fifteenth aspect of the present invention provides the communications device as recited in the thirteenth aspect or the fourteenth aspect, wherein the managing unit further stores the ISAKMP SA expiration time associated with the identifier of the ISAKMP SA. In this device, the judging unit judges whether there is no other IPsec SA established by the ISAKMP SA and whether the ISAKMP SA expiration time has been exceeded. In addition, if there is no other IPsec SA established by the ISAKMP SA and the judging unit judges that the expiration time of the ISAKMP SA has been exceeded, then the deleting unit deletes from the managing unit the identifier of the ISAKMP SA.

There are situations in which, when the lifetime of an IPsec SA has run out, the ISAKMP SA that was used to establish that IPsec SA is deleted. However, that is a situation in which there is no other IPsec SA that was established by that ISAKMP SA and that ISAKMP SA expiration time has been exceeded. Accordingly, even if the IPsec SA expiration time is longer than the ISAKMP SA expiration time, the Delete Payload of that IPsec SA can be reliably received using the ISAKMP SA that was used to establish that IPsec SA.

A sixteenth aspect of the present invention provides the communications device as recited in the thirteenth aspect, wherein the judging unit judges whether an ISAKMP SA other than the ISAKMP SA to be deleted is established with the other communications device. This device further comprises a reestablishing unit that establishes a new ISAKMP SA in accordance with the judgment results of the judging unit.

There are situations in which, if an ISAKMP SA is to be deleted in accordance with the deletion of an IPsec SA, there will no longer be an ISAKMP SA established with the other communications device. Even in these situations, it is conceivable that another IPsec SA exists with that other communications device. Therefore, it is preferable to newly establish in advance an ISAKMP SA having the possibility of being used to transmit the Delete Payload of that other IPsec SA. In addition, if a new ISAKMP SA is established in advance, then using it has the advantage of facilitating the establishment of a new IPsec SA as needed.

This applies also to deleting an ISAKMP SA based on the transmission and reception of a Delete Payload of an ISAKMP SA.

A seventeenth aspect of the present invention provides the communications device as recited in the sixteenth aspect, wherein in response to the reception of the IPsec SA Delete Payload by the receiving unit, the reestablishing unit judges whether an ISAKMP SA other than the ISAKMP SA is established with the other communications device, and establishes a new ISAKMP SA in accordance with the judgment results.

The ISAKMP SA needed to transmit the IPsec SA can be generated as needed.

An eighteenth aspect of the present invention provides a communications method executed by a communications device that performs encrypted communications by establishing, based on IPsec (IP security protocol) and IKE (Internet Key Exchange), an ISAKMP (Internet Security Association and Key Management Protocol) SA (Security Association) and an IPsec SA. This method comprises the following steps:

a storing step that stores an identifier of another communications device with which encrypted communications is performed; an identifier of an IPsec SA established with that other communications device; and an identifier of an ISAKMP SA established with that other communications device;

a receiving step that receives a Delete Payload of the IPsec SA from the other communications device using an arbitrary ISAKMP SA;

a judging step that judges whether the ISAKMP SA satisfies the reception condition of the Delete Payload of the IPsec SA; and a deleting step that, if the judging step judges that the reception condition is satisfied, deletes the IPsec SA identifier from the storage target of the storing step.

This aspect of the present invention accomplishes the same operational effects as the tenth aspect of the present invention.

A nineteenth aspect of the present invention provides a communications system comprising a first communications device and a second communications device that perform encrypted communications by establishing, based on IPsec (IP security protocol) and IKE (Internet Key Exchange), an ISAKMP (Internet Security Association and Key Management Protocol) SA (Security Association) and an IPsec SA. In this system, the first communications device comprises the following:

a first managing unit that stores an identifier of the second communications device with which encrypted communications is performed; an identifier of an IPsec SA established with the second communications device; and an identifier of an ISAKMP SA established with the second communications device;

a first judging unit that, from among ISAKMP SAs whose identifiers are stored by the first managing unit, specifies one or a plurality of ISAKMP SAs established with the second communications device and that satisfies an IPsec SA Delete Payload transmission condition stored by the first managing unit;

a transmitting unit that uses one or a plurality of ISAKMP SAs specified by the first judging unit to transmit a Delete Payload of the IPsec SA; and a first deleting unit that deletes from the first managing unit the identifier of the IPsec SA to be deleted by the Delete Payload.

The second communications device comprises the following:

a second managing unit that stores an identifier of the first communications device with which encrypted communications is performed; an identifier of an IPsec SA established with the first communications device; and an identifier of an ISAKMP SA established with the first communications device;

a receiving unit that receives a Delete Payload of the IPsec SA from the first communications device using an arbitrary ISAKMP SA;

a second judging unit that judges whether the ISAKMP SA satisfies the reception condition of the Delete Payload of the IPsec SA; and a second deleting unit that, if the second judging unit judges that the reception condition is satisfied, deletes the IPsec SA identifier from the second managing unit.

This system comprises the communications device of the first aspect of the present invention and the communications device of the tenth aspect of the present invention, and accomplishes the same operational effects as the first aspect of the present invention and the tenth aspect of the present invention.

Use of the present invention prevents an inconsistency in an IPsec SA between communications devices. In addition, a new IPsec SA can be quickly established after the deletion of an IPsec SA.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4 is a general explanatory diagram of data accumulated in a control table;

FIG. 5 is a general explanatory diagram of data accumulated in a condition table;

DETAILED DESCRIPTION

First Embodiment

Figure 1:
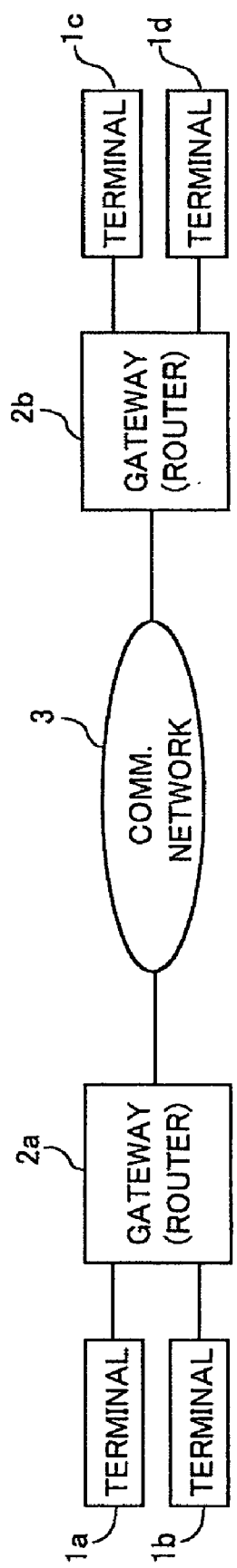
FIG. 1 is an example of a network configuration that uses communications devices according to the present embodiment.

A first embodiment of the present invention will be described below with reference to the drawings. FIG. 1 is an explanatory diagram that depicts an example of a network configuration that uses communications devices according to the present embodiment. In the network configuration of FIG. 1, communications terminals (communications devices) 1a, 1b and communications terminals (communications devices) 1c, 1d are respectively connected to gateways (communications devices) 2a, 2b. The gateways 2a, 2b are connected to one another by a communications network. Hereinbelow, the communications terminals 1a-1d and the gateways 2a, 2b are referred to as communications devices. Furthermore, it is understood that the network configuration that uses the communications devices wherein the present invention is applied is not limited to the configuration depicted in FIG. 1.

Figure 2:
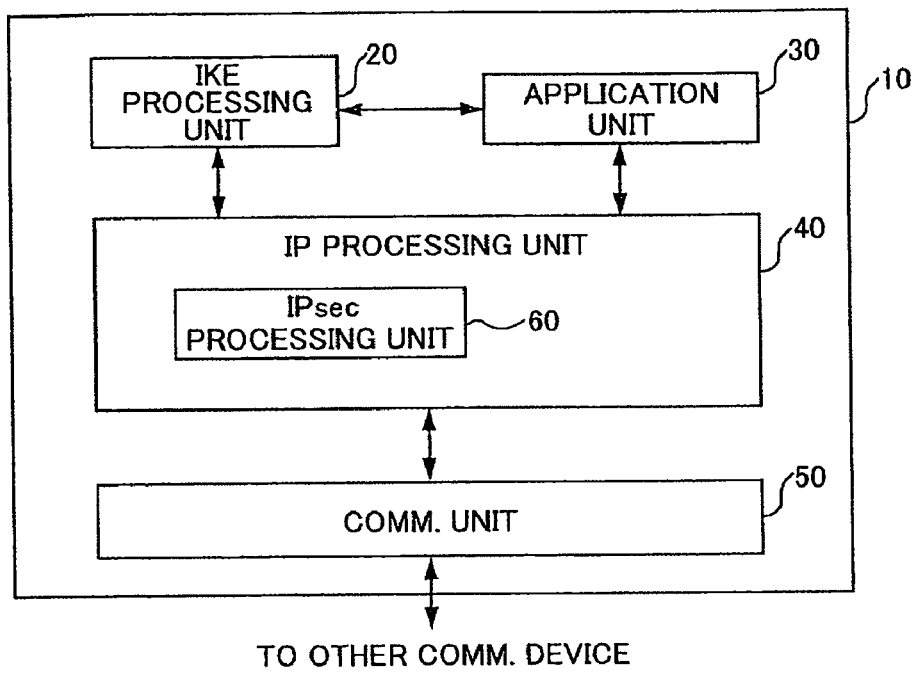
FIG. 2 is a block diagram that depicts the functional configuration of a communications device.

(1) Configuration of a Communications Device (1-1) Overview of Overall Configuration and Operation of a Communications Device FIG. 2 is a block diagram that depicts the functional configuration of a communications device 10. The communications device 10 comprises an IKE processing unit 20, an application unit 30, an IP processing unit 40, and a communications unit 50. The IP processing unit 40 comprises an IPsec processing unit 60. Furthermore, only one application unit 30 is illustrated in FIG. 2, but it is acceptable to have a plurality thereof. The communications device 10 having such functions is implemented by a computer having a CPU, ROM, RAM, a hard disc, and the like. The CPU functions as the IKE processing unit 20, the application unit 30, the IP processing unit 40, and the communications unit 50.

The conditions for using encrypted communications with another communications device is set in the IKE processing unit 20 and the IP processing unit 40. It is acceptable that the setting of these conditions be, for example, the initialization of the communications device, and it is also acceptable that it be a setting from the application unit 30. The IKE processing unit 20 performs automatic key exchange processing in accordance with a request from the application unit 30 or the IP processing unit 40. The application unit 30 requests the IP processing unit 40 to perform relevant transmission and reception processing by performing prescribed communications processing with the other communications device in accordance with the algorithm of the application. The IP processing unit 40 performs processing related to the transmitting and receiving of IP packets. The communications unit 50 performs transmission and reception processing specific to the communications medium.

The communications device 10 having the abovementioned configuration operates as follows. When communication with the other communications device starts, the application unit 30 tries to transmit an IP packet to the other communications device. The IP processing unit 40 judges whether the IP packet is the object of encrypted communications, using the IPsec processing unit 60 as needed. If it is the object of encrypted communications, then the IP processing unit 40 confirms the presence of IPsec SA data; if present, then the IP processing unit 40 encrypts the IP packet and transmits a Request-To-Send to the communications unit 50. However, if IPsec SA data is not present, then the IP processing unit 40 requests the IKE processing unit 20 for the data of the IP packet to be encrypted, and to establish an IPsec SA. The IKE processing unit 20 starts automatic key exchange processing (IKE negotiation processing) with the other communications device in conformance with preset conditions and in accordance with the received request to establish an IPsec SA. The data and automatic key exchange processing is transmitted and received using UDP (User Datagram Protocol) over an IP packet. Consequently, the IP processing unit 40 is used to transmit and receive data in automatic key exchange processing.

Furthermore, prior to that communication, the application unit 30 can also instruct the IKE processing unit 20 beforehand to establish an ISAKMP SA and an IPsec SA with the corresponding opposite device.

(1-2) Configuration of IKE Processing Unit

Figure 3:
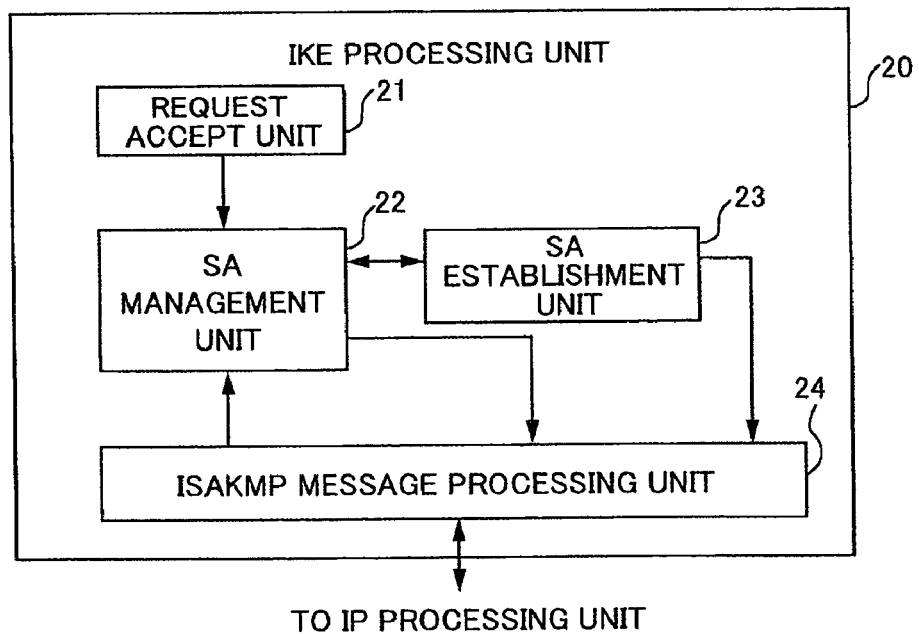
FIG. 3 is an explanatory diagram that depicts the functional configuration of an IKE processing unit.

FIG. 3 is an explanatory diagram that depicts the functional configuration of the IKE processing unit 20. The IKE processing unit 20 includes a request accept unit 21, an SA management unit 22, an SA establishment unit 23, and an ISAKMP message processing unit 24.

Request Accept Unit

The request accept unit 21 accepts an IPsec SA establishment request from the application unit 30 or the IP processing unit 40, and instructs the SA management unit 22 to start IKE negotiation processing. In addition, the request accept unit 21 instructs the SA management unit 22 to set the condition to apply to encrypted communications with the other communications device. IKE negotiation processing includes ISAKMP SA establishment and disconnection, and IPsec SA establishment and disconnection.

SA Control Unit

The SA management unit 22 manages the establishment, disconnection, and updating of the ISAKMP SA and the IPsec SA (hereinafter, these may be referred to collectively as an SA). To manage an SA, the SA management unit 22 retains a control table 22a. The control table 22a stores data related to each ISAKMP SA and IPsec SA (hereinafter, referred to as SA data). The SA data is registered, deleted, and updated in accordance with the establishment, disconnection, and updating of the SA. In addition, the SA management unit 22 can reestablish a new ISAKMP SA if the ISAKMP SA has completely disappeared, or before it completely disappears.

(a) Control Table

FIG. 4 is a general explanatory diagram of the data retained by the SA management unit 22 and accumulated in the control table 22a. The control table 22a includes in each record at least an "ISAKMP SA ID," an "IPsec SA ID," and an "other communications device" identifier. The purpose of the above data is to manage with which other communications device the IPsec SA and the ISAKMP SA are established. In addition, if a correspondence is created beforehand between the SA and the other communications device, then it becomes possible to switch the SA disconnect method in accordance with the other communications device. Although an IP address is used in this example for the identifier of the other communications device, other device specific data, such as a communications address or a MAC address, can also be used. Furthermore, if the ISAKMP SA ID and the IPsec SA ID correspond to a yet another communications device, then it is also possible to adopt the same value.

In the present example, the "ISAKMP SA expiration," the "ISAKMP SA status," the "IPsec SA expiration," and a "vender ID" that indicates the manufacturer of the other communications device is further included in each record. By managing the ISAKMP SA expiration, it becomes possible on the occasion when the ISAKMP SA lifetime has run out to modify that ISAKMP SA status, to transmit a Delete Payload of that ISAKMP SA, and the like. By managing the ISAKMP SA status, it becomes possible to prevent the unlimited establishment of new IPsec SAs using an ISAKMP SA whose lifetime has run out. If the status is "establishment completed," then it indicates that the lifetime of that ISAKMP SA has not run out, and that an IPsec SA can be established. If the status is "cannot establish new IPsec SA," then it indicates that the lifetime of that ISAKMP SA has run out.

By managing the IPsec SA expiration, it becomes possible on the occasion when the lifetime of the IPsec SA has run out to disconnect the ISAKMP SA that established that IPsec SA, to transmit a Delete Payload of that IPsec SA, and the like. By managing the vender ID, it becomes possible to specify the manufacturer of the other communications device, and to switch the SA disconnect method to suit the status of the implementation adopted by the product of that manufacturer. Furthermore, the vender ID can be acquired at the time of IPsec SA establishment.

(b) SA Establishment and Updating

SA establishment is performed as follows. If an ISAKMP SA is not established with the other communications device, then the SA management unit 22 instructs the SA establishment unit 23 to establish an ISAKMP SA with the other communications device. In addition, after ISAKMP SA establishment, the SA management unit 22 instructs the SA establishment unit 23 to establish an IPsec SA using that ISAKMP SA. Furthermore, the SA management unit 22 registers the new SA data in the control table 22a attendant with the establishment of the ISAKMP SA or the IPsec SA. In addition, the SA management unit 22 performs SA updating in the same manner as SA establishment, and updates the SA data in the control table 22a.

(c) SA Disconnection and Termination (c-1) Disconnection by Transmitting a Delete Payload SA disconnection can be divided into disconnection based on transmission or reception of an SA Delete Payload, and disconnection based on the SA lifetime. Disconnection based on transmission of a Delete Payload is performed as follows. The SA management unit 22 instructs the ISAKMP message processing unit 24 to transmit the ISAKMP SA and the IPsec SA Delete Payload, and deletes the IPsec SA data in the control table 22a in accordance with the IPsec SA Delete Payload. At this time, the ISAKMP SA that meets the transmission condition is the one selected to transmit the IPsec SA Delete Payload. It is acceptable that the transmission condition is shared by all other communications devices, and it is also acceptable that it be switched for each other communications device. In addition, it is also acceptable to group other communications devices, and to switch the transmission condition by group. The transmission condition will be discussed later in detail. In addition, the details of updating the ISAKMP SA data by transmitting an ISAKMP SA Delete Payload will be discussed later.

(c-2) Disconnection by Reception of a Delete Payload

Disconnection of an SA by reception of a Delete Payload is performed as follows. The SA management unit 22 accepts from the ISAKMP message processing unit 24 a request to process the reception of a Delete Payload of an ISAKMP SA and an IPsec SA, and updates the SA data in the control table 22a in accordance with the Delete Payload. However, if the SA management unit 22 receives an IPsec SA Delete Payload, then it judges whether the ISAKMP SA used for that reception satisfies the reception condition; if yes, then it deletes the IPsec SA data. It is acceptable to share the reception condition with all other communications devices, and it is also acceptable to switch the reception condition for each other communications device. In addition, it is also acceptable to group the other communications devices and switch the reception condition by group. The details of the reception condition will be discussed later. The details of updating the ISAKMP SA data when an ISAKMP SA Delete Payload is received will be discussed later.

(c-3) Disconnection Based on SA Lifetime

The disconnection of an SA based on the SA lifetime is performed as follows. The SA management unit 22 deletes from the control table 22a the SA data of the IPsec SA whose lifetime has run out. In addition, the SA management unit 22 updates the ISAKMP SA data attendant with the expiration of the IPsec SA lifetime or the ISAKMP SA lifetime. The details of this updating will be discussed later. Attendant with the expiration of the SA lifetime, it is also acceptable for the SA management unit 22 to request the ISAKMP message processing unit 24 to transmit the Delete Payload of the SA whose lifetime has run out.

(d) Updating of ISAKMP SA Data

The ISAKMP SA data in the control table 22a is updated (i) when an ISAKMP SA Delete Payload is received, (ii) when the ISAKMP SA lifetime has expired, and (iii) when the IPsec SA has been deleted or when its lifetime has expired. The content of the intercommunication of the ISAKMP SA by update timing will be discussed below in detail. The content of the update is broadly classified by the deletion of the SA data itself, and the updating of the ISAKMP SA status. Hereinbelow, the deletion of SA data for the purpose of disconnecting the SA is referred to simply as SA deletion.

(i) When Transmitting of Receiving an ISAKMP SA Delete Payload

If an IPsec SA exists that was established using that ISAKMP SA, then the status of that ISAKMP SA is set to "cannot establish new IPsec SA." Conversely, if an IPsec SA does not exist, then the data of that ISAKMP SA is deleted.

If an IPsec SA exists that was established using the ISAKMP SA to be deleted, then there is a possibility that that ISAKMP SA will be needed to transmit that Delete Payload. Moreover, the IPsec SA Delete Payload may no longer be able to be transmitted and received at the communications device of the implementation mode that is to transmit or receive the Delete Payload using the ISAKMP SA that was used to establish the IPsec SA. There is a risk that this will cause an inconsistency in the SA data among the communications devices. Therefore, the ISAKMP SA to be deleted is reserved. However, its status is set to "cannot establish new IPsec SA" to prevent the further establishment of a new IPsec SA based on that ISAKMP SA. The reasoning is that it is sufficient as long as the already established IPsec SA can be deleted using that ISAKMP SA.

(ii) When the ISAKMP SA Lifetime Has Expired

If an IPsec SA exists that was established using that ISAKMP SA, then the status of that ISAKMP SA is set to "cannot establish new IPsec SA." Conversely, if an IPsec SA does not exist, then the data of that ISAKMP SA is deleted.

If an IPsec SA exists that was established using that ISAKMP SA even if the expiration time of that ISAKMP SA has expired, then there is a possibility that that ISAKMP SA will be needed to transmit that Delete Payload. Moreover, it will no longer be possible to transmit and receive the Delete Payload at the communications device of the implementation mode that will transmit or receive the Delete Payload using the ISAKMP SA used to establish the IPsec SA. There is a risk that this will cause an inconsistency in the SA data among the communications devices. Therefore, that ISAKMP SA is reserved even if the expiration time has expired. However, the status is set to "cannot establish new IPsec SA" to prevent the establishment of further new IPsec SAs based on an ISAKMP SA whose expiration time has been exceeded. The reasoning is that it is sufficient as long as the already established IPsec SA can be deleted using that ISAKMP SA.

(iii) When Deleting the IPsec SA or When the IPsec SA Lifetime Has Expired

If, for the ISAKMP SA used to establish that IPsec SA, another IPsec SA exists that was established using that ISAKMP SA, then the status of that ISAKMP SA is set to "cannot establish new IPsec SA." If another IPsec SA does not exist, then the data of that ISAKMP SA is deleted.

There are situations where, after a certain IPsec SA has been deleted or after its lifetime has expired, it is better not to delete the ISAKMP SA used to establish that IPsec SA. These are situations in which another IPsec SA is established by that ISAKMP SA. In these situations, if the ISAKMP SA is unfortunately deleted, then there is a risk that the transmission of a Delete Payload of another IPsec SA will be hindered by the implementation mode of the communications device. Moreover, it will unfortunately no longer be possible to transmit and receive a Delete Payload at the communications device of the implementation mode that will transmit or receive the Delete Payload using the ISAKMP SA that was used to establish the IPsec SA. There is a risk that this will cause an inconsistency in the SA data among the communications devices. Therefore, if another IPsec SA is established, then it is preferable to not delete the ISAKMP SA that was used to establish the IPsec SA to be deleted. This is likewise for a situation in which the IPsec SA expiration time has been exceeded.

(e) IPsec SA Delete Payload Transmission Condition and Reception Condition

As discussed earlier, the Delete Payload of an IPsec SA is transmitted using an ISAKMP SA that satisfies a prescribed transmission condition. Conversely, the data of the target IPsec SA is deleted only if the Delete Payload of an IPsec SA is received using an ISAKMP SA that satisfies the prescribed reception condition. The SA management unit 22 stores the transmission condition and the reception condition.

For example, the following cites conditions for the transmission conditions and the reception conditions to transmit the Delete Payload of an IPsec SA.

Transmission Condition 1: Transmit by all ISAKMP SAs established with the other communications device for which the IPsec SA to be deleted is established.

Transmission Condition 2: Transmit by the ISAKMP SA that was used to establish the IPsec SA.

Transmission Condition 3: Transmit by the latest ISAKMP SA whose status is establishment completed.

Reception Condition 1: Receive by any one of all ISAKMP SAs established with the other communications device for which the IPsec SA to be deleted is established.

Reception Condition 2: Receive by the ISAKMP SA that was used to establish the IPsec SA.

Reception Condition 3: Receive by the latest ISAKMP SA whose status is establishment completed.

For example, if using the above transmission condition 1, then the Delete Payload of the IPsec SA can be transmitted using at least one ISAKMP SA, and the IPsec SA data can be deleted on both sides, even if the reception condition of the Delete Payload of the other communications device is any one of the abovementioned reception conditions 2, 3. Conversely, if using the above reception condition 1, then the Delete Payload of the IPsec SA can be received using at least one ISAKMP SA, and the IPsec SA data can be deleted on both sides, even if the transmission condition of the Delete Payload of the other communications device is any one of the above transmission conditions 2, 3. At this point, not only does the ISAKMP SA established with the other communications device exist with the other communications device, but it is said to be an ISAKMP SA whose lifetime has not run out. A lifetime that has not run out is namely a state wherein a new IPsec SA can be established.

In addition, consider another example wherein the transmission conditions and the reception conditions are prestored in the SA management unit 22 in accordance with the other communications device. By selectively using the ISAKMP SA for use in transmitting the Delete Payload of the IPsec SA, the transmitting side communications device can efficiently transmit the Delete Payload. In addition, there is reduced risk that the receiving side communications device will unfortunately delete IPsec SA data based on an improper IPsec SA Delete Payload, thus enhancing the safety of the encrypted communications.

In yet another example, the other communications devices are grouped, and the transmission conditions and reception conditions can be switched by group. FIG. 5 is a condition table 22b that stores reception conditions by vender ID. The SA management unit 22 stores and manages the condition table 22b in the same manner as the control table 22a. If the SA management unit 22 transmits a Delete Payload of the IPsec SA, then it references the control table 22a beforehand, and reads out the vender ID of the other communications device for which the IPsec SA to be deleted is established. Furthermore, the SA management unit 22 reads out from the condition table 22b the reception condition of the vender ID that was read out. After specifying, based on the control table 22a, the ISAKMP SA that satisfies the read out reception condition, the SA management unit 22 transmits the Delete Payload of the IPsec SA using that ISAKMP SA. In this manner, the Delete Payload of the IPsec SA can be transmitted and received on both sides because the Delete Payload that was transmitted in this manner certainly satisfies the reception condition of the receiving side communications device. Thereby, the transmission of wasteful Delete Payloads is eliminated, enabling the efficient and safe transmission and reception of Delete Payloads.

(f) Reestablishment of an ISAKMP SA

When an ISAKMP SA is to be deleted, the SA management unit 22 can establish a new ISAKMP SA. If the ISAKMP SA is deleted, then there may be no ISAKMP SA established with the other communications device. Even in that situation, it is conceivable that another IPsec SA exists with that other communications device. Therefore, it is preferable to newly establish an ISAKMP SA beforehand having the possibility of being used to transmit the Delete Payload of another IPsec SA. In addition, if a new ISAKMP SA is established beforehand, then using it has the advantage of facilitating the establishment of a new IPsec SA as needed.

SA Establishing Unit

The SA establishment unit 23 performs IKE negotiation processing to establish an SA in accordance with a request from the SA management unit 22, and requests the ISAKMP message processing unit 24 to process the construction of the corresponding ISAKMP message. In addition, the SA management unit 22 receives an IKE negotiation processing request from the other communications device, performs IKE negotiation processing, and requests the SA management unit 22 to update the SA data. SA establishment and IKE negotiation processing themselves are stipulated in an RFC, the present invention does not deviate from that scope, and the explanation thereof is therefore omitted.

ISAKMP Message Processing Unit

In response to a request from the SA establishment unit 23 and a request from the SA management unit 22, the ISAKMP message processing unit 24 constructs the corresponding ISAKMP message, and requests the IP processing unit 40 to transmit the constructed message. In addition, the ISAKMP message processing unit 24 analyzes the ISAKMP message received from the IP processing unit 40 in accordance with the definitions of the RFC. If the ISAKMP message is an IKE negotiation processing request from the other communications device, then the SA establishment unit 23 is instructed to perform that processing. If the ISAKMP message is a Delete Notify, then the ISAKMP message processing unit 24 extracts the Delete Payload included in that Delete Notify, and instructs the SA management unit 22 to perform that processing. Furthermore, when an ISAKMP message is transmitted and received, the ISAKMP message processing unit 24 performs operations stipulated by RFC 2407 through RFC 2409, such as the prescribed encryption and decryption, the appending of authentication data, and the authentication of authentication data.

(2) Processing Performed by the Communications Device

The flow of processing performed by the communications device 10 according to the present embodiment is described below with reference to the drawings. The communications device 10 performs (2-1) IPsec SA Delete Payload transmission processing, (2-2) ISAKMP SA reestablishment processing, (2-3) Delete Payload reception processing, (2-4) IPsec SA lifetime expiration processing, and (2-5) ISAKMP SA lifetime expiration processing.

(2-1) IPsec SA Delete Payload Transmission Processing

Figure 6:
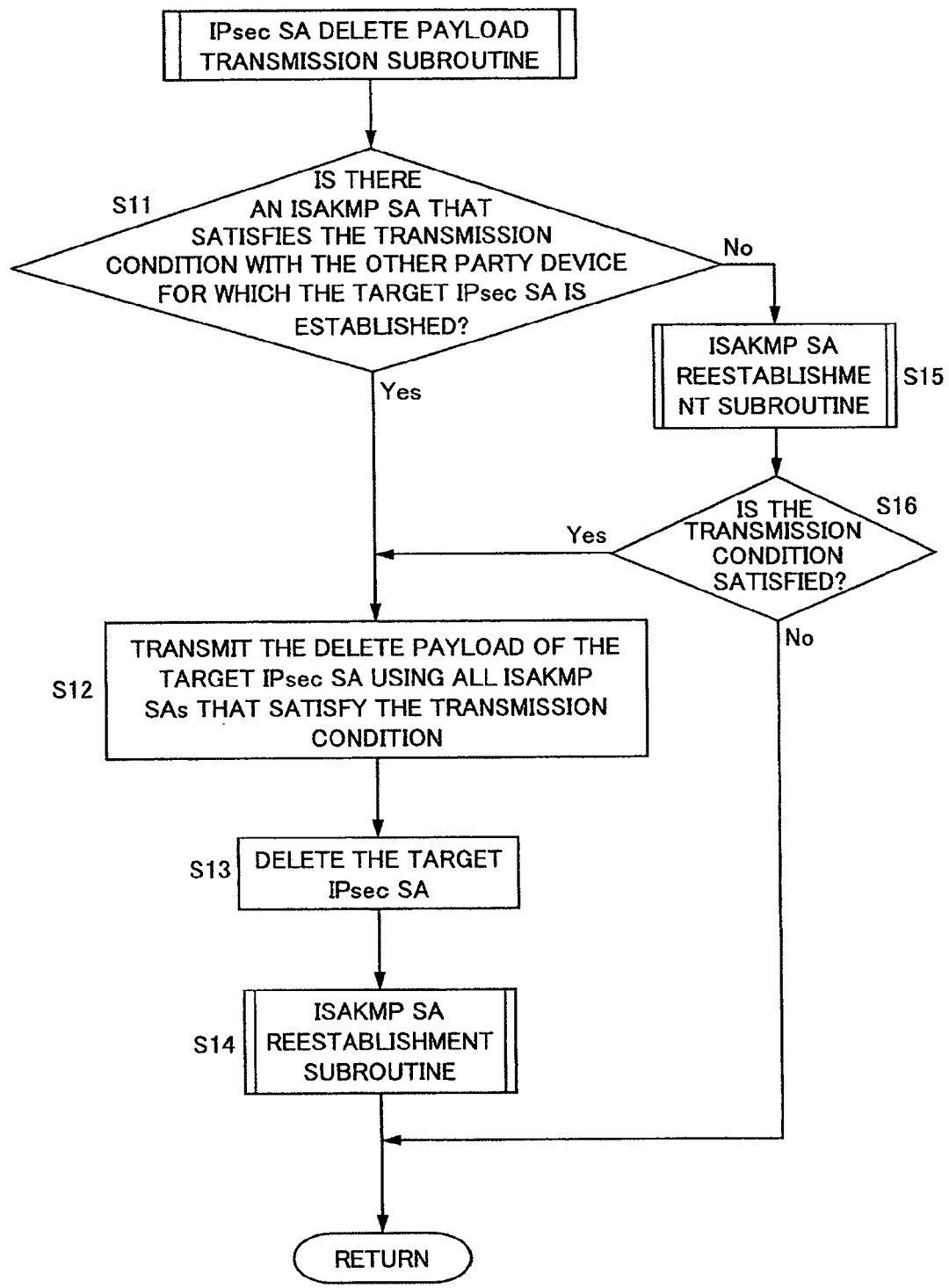
FIG. 6 is a flow chart that depicts one example of the flow of a IPsec SA Delete Payload transmission process.

FIG. 6 is a flow chart that depicts one example of the flow of IPsec SA Delete Payload transmission processing performed by the SA management unit 22. This processing is executed if there has been a request to delete an IPsec SA from an application 30 or an operator. This processing increases the probability that the IPsec SA Delete Payload will be accepted by the receiving side communications device, regardless of the reception condition of the receiving side communications device. Furthermore, because the present process is called by other processes, the present process is illustrated in the form of a subroutine in the present embodiment.

Step S11: The SA management unit 22 judges whether an ISAKMP SA exists that satisfies the transmission condition with the other communications device for which the IPsec SA to be deleted is established. To prevent an inconsistency in the IPsec SA data for the communications device on each side, it is preferable to set the transmission condition as broadly as possible if the implementation mode of the other communications device is unclear. For example, as discussed earlier, it is preferable to transmit a Delete Payload using any ISAKMP SA established with the other communications device. If the implementation mode of the other communications device is ascertained, then it is also acceptable for the SA management unit 22 to reference the control table 22a and the condition table 22b, and judge whether an ISAKMP SA exists that satisfies the reception condition of the other communications device.

Step S12: If there is an ISAKMP SA that satisfies the transmission condition, then the SA management unit 22 transmits a Delete Payload of the IPsec SA to be deleted using all ISAKMP SAs that satisfy the transmission condition. In the present embodiment, the Delete Payload is transmitted using all ISAKMP SAs that satisfy the reception condition of the other communications device. It is acceptable that the ISAKMP SA used is one whose status is "cannot establish new IPsec SA."

Step S13: The SA management unit 22 deletes the IPsec SA to be deleted. Specifically, the SA management unit 22 deletes the ID and the lifetime of the target IPsec SA from the control table 22a. The IPsec SA is thereby disconnected.

Step S14: The SA management unit 22 executes the ISAKMP SA reestablishment subroutine, which is discussed later, and secures an ISAKMP SA established with the other communications device. Thereby, a new IPsec SA can easily be established using that ISAKMP SA. Furthermore, it is also acceptable to perform this step prior to Step S11.

In addition, after the IPsec SA to be deleted is deleted, it is also acceptable to judge whether there is another IPsec SA established by the ISAKMP SA used to establish the deleted IPsec SA. If there is no other IPsec SA, then it is acceptable to delete that ISAKMP SA. In addition, it is also acceptable to delete that ISAKMP SA if it is in the "cannot establish new IPsec SA" state.

Steps S15-S16: If there is no ISAKMP SA that satisfies the transmission condition, then the SA management unit 22 executes the ISAKMP SA reestablishment subroutine, which is discussed later, and establishes an ISAKMP SA with the other communications device. Subsequently, it is judged whether the newly established ISAKMP SA satisfies the transmission condition with the other communications device. If it satisfies such, then the processing of the above Steps S12-S14 is executed, and the Delete Payload of the IPsec SA is transmitted using the newly established ISAKMP SA. If the newly established ISAKMP SA does not satisfy the transmission condition, then processing of the present subroutine terminates.

Based on the above processing, if transmitting a Delete Payload of an IPsec SA, the Delete Payload is transmitted using all ISAKMP SAs established with the other communications device for which that IPsec SA is established. If there is no ISAKMP SA to transmit the Delete Payload, then an ISAKMP SA is reestablished, and the Delete Payload is transmitted. Thereby, an accepted Delete Payload can also be transmitted also to another communications device that needs to transmit the Delete Payload using the ISAKMP SA that was used to establish the IPsec SA, as well as another communications device that needs to transmit the Delete Payload using an ISAKMP SA in the "establishment completed state." Accordingly, it is possible to prevent an inconsistent state of the IPsec SA in the communications device on each side, and to enhance the reliability of the encrypted communications.

(2-2) ISAKMP SA Reestablishment Processing

Figure 7:
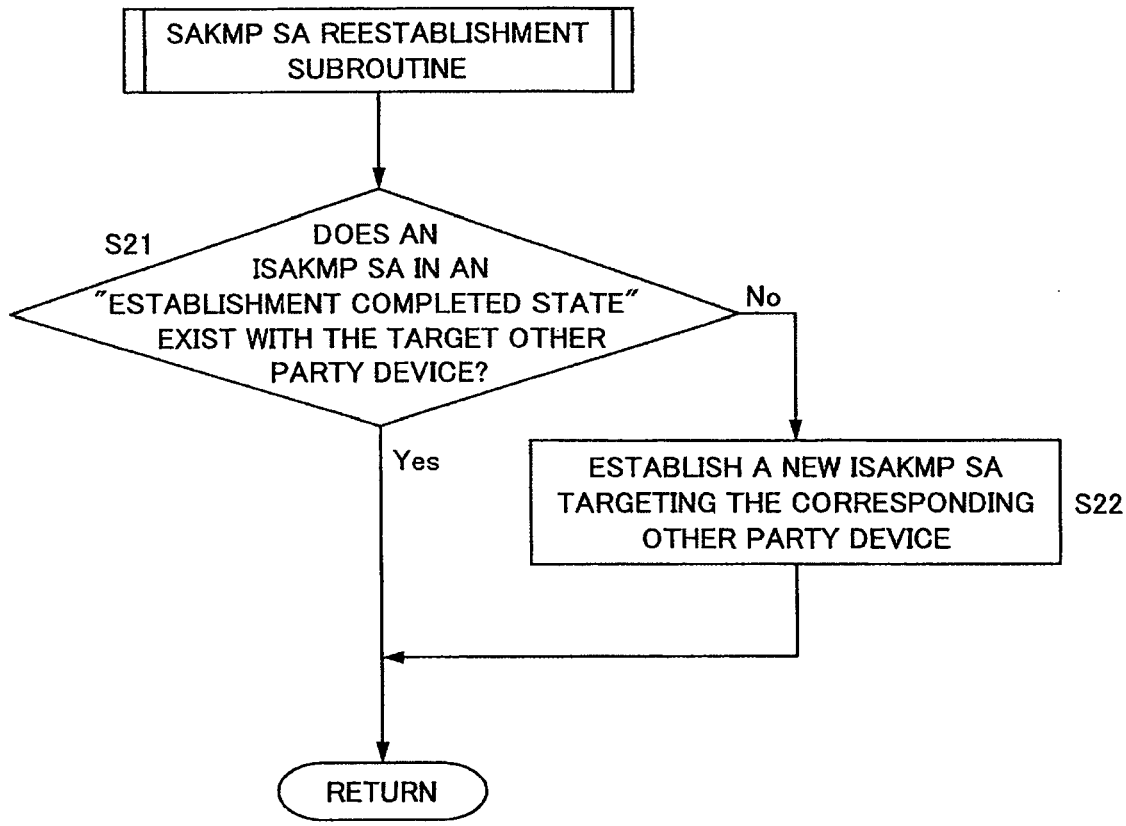
FIG. 7 is a flow chart that depicts one example of the process flow of a ISAKMP SA reestablishment subroutine.

FIG. 7 is a flow chart that depicts one example of the flow of processing of the ISAKMP SA reestablishment subroutine. This processing enables the maintenance of the ISAKMP SA established with the communications device that is performing encrypted communications. In the present embodiment, this process is called in another process, and is therefore illustrated in the form of a subroutine.

Step S21: The SA management unit 22 judges whether an ISAKMP SA in an establishment completed state exists with the other communications device, and terminates processing if one exists.

Step S22: If an ISAKMP SA in an establishment completed state does not exist, then the SA management unit 22 establishes a new ISAKMP SA with the other communications device. Specifically, the SA management unit 22 requests the SA establishment unit 23 to establish a new ISAKMP SA.

Performing this process causes the continuous existence of an ISAKMP SA established with the communications device, and enables the establishment of a new IPsec SA to be prepared. In addition, it is possible to enable the transmission and reception of such a Delete Payload in a communications device having an implementation mode that requires the transmission and reception of a Delete Payload of an IPsec SA by an established ISAKMP SA.

(2-3) Delete Payload Reception Processing

Figure 8A:
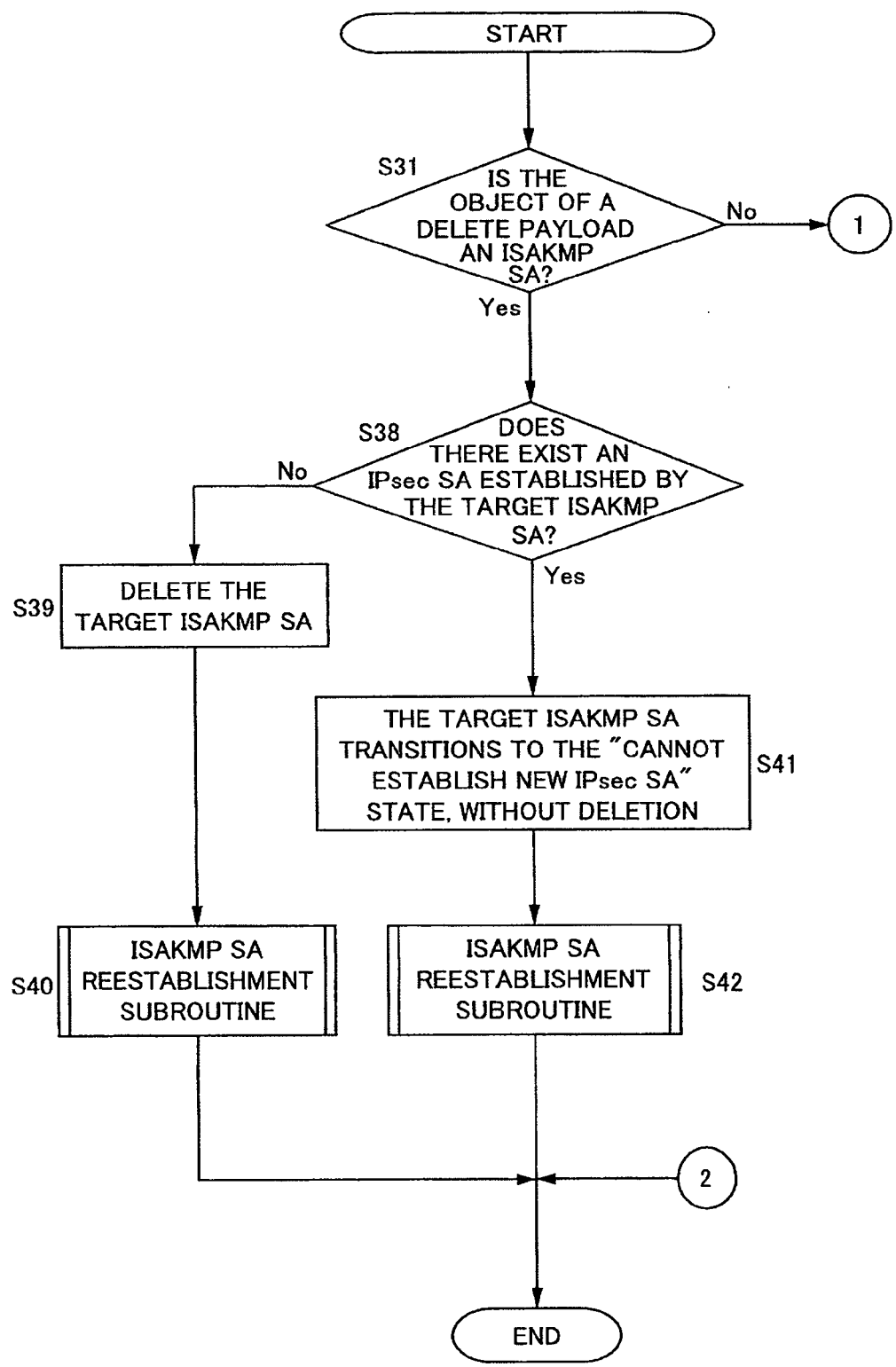
FIG. 8A, 8B is a flow chart that depicts one example of the flow of a Delete Payload reception process.
Figure 8B:
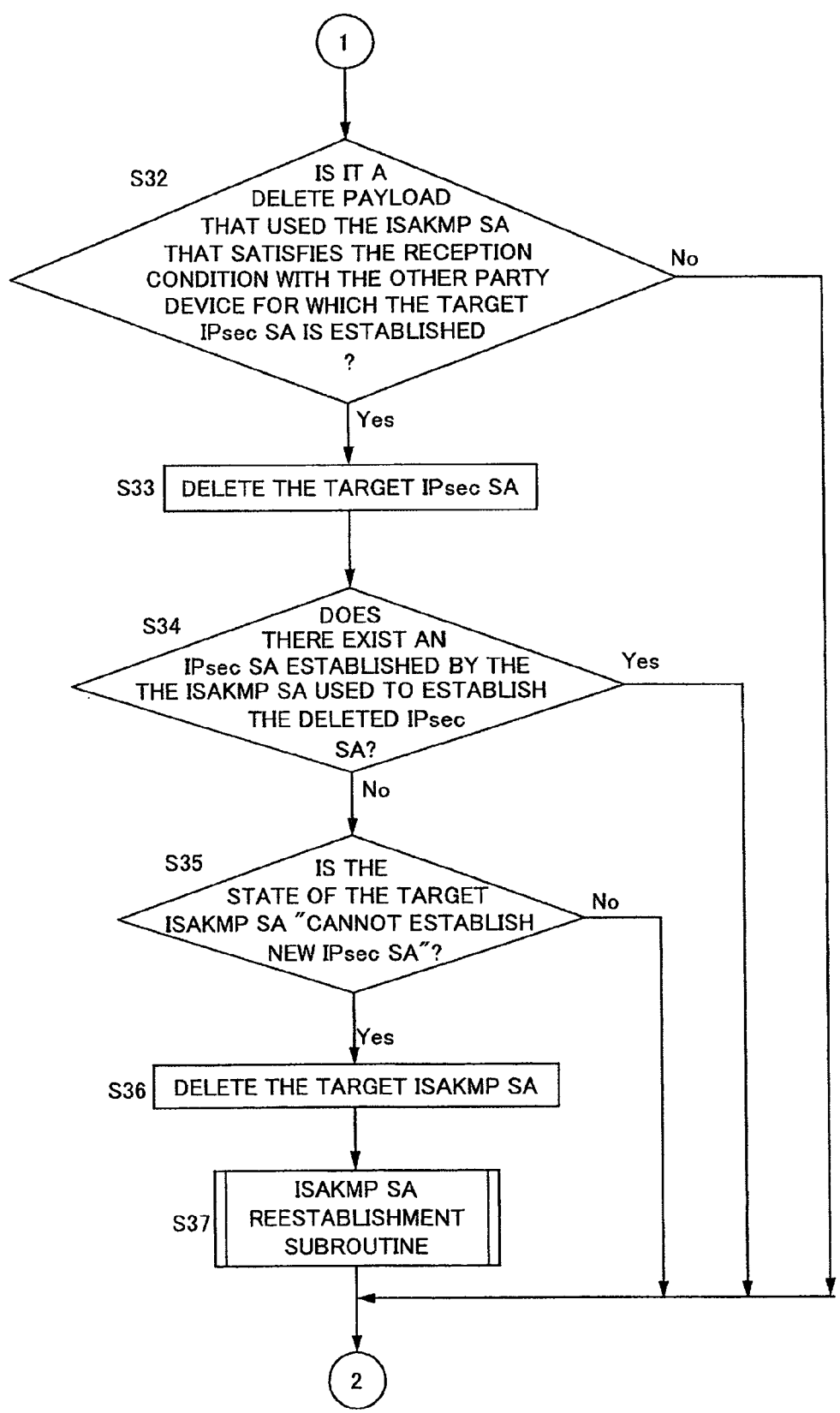

FIG. 8A, 8B is a flow chart that depicts one example of the flow of the Delete Payload reception processing performed by the SA management unit 22. The Delete Payload includes the Delete Notify, which is classified by the ISAKMP Notify Message. This Delete Notify is analyzed by the ISAKMP message processing unit 24, and the following process is started when each Delete Payload is passed to the SA management unit 22.

Step S31: The SA management unit 22 judges whether the SA subject to the Delete Payload passed from the ISAKMP message processing unit 24 is an ISAKMP SA or an IPsec SA. Processing transitions to Step S32 if it is an IPsec SA, and transitions to Step S38, which is discussed later, if it is an ISAKMP SA.

Step S32: The SA management unit 22 judges whether a Delete Payload has been received using an ISAKMP SA that satisfies the reception condition with the other communications device for which the IPsec SA to be deleted is established. If it judges "No," then the present process terminates. Ignoring a Delete Payload received by an ISAKMP SA that does not satisfy the reception condition enhances the safety of the IPsec SA. Conversely, if a Delete Payload is received by an ISAKMP SA that satisfies the reception condition, then processing transitions to Step S33. It is preferable to set the reception condition as broadly as possible to prevent an inconsistency in the IPsec SA data of the communications device on each side. For example, as discussed earlier, it is preferable to execute the delete processing if a Delete Payload is received that used any ISAKMP SA established with the other communications device.

Step S33: The SA management unit 22 deletes from the control table 22a the SA data of the IPsec SA to be deleted. For example, the ID and the lifetime of the corresponding IPsec SA are deleted from the control table 22a. The IPsec SA is thereby disconnected.

Step S34: The SA management unit 22 judges, referencing the control table 22a, whether another IPsec SA exists that was established by the ISAKMP SA used to establish the deleted IPsec SA. If another IPsec SA exists, then the present process is terminated without deleting that ISAKMP SA. This is because the abovementioned ISAKMP SA may be needed in the Delete Payload of that IPsec SA, depending on the implementation mode of the communications device. If another IPsec SA does not exist, then processing transitions to Step S35.

Steps S35-S36: The SA management unit 22 judges whether the status of the abovementioned ISAKMP SA is "cannot establish new IPsec SA" (S35). If the status of that ISAKMP SA is cannot establish new IPsec SA, then the SA management unit 22 deletes that ISAKMP SA data from the control table 22a (S36). This is because, regardless of the fact that that ISAKMP SA remains only in the Delete Payload transmission of the IPsec SA that was established using that ISAKMP SA, it is not very meaningful to further perpetuate that ISAKMP SA since such an IPsec SA will cease to exist. Conversely, if that ISAKMP SA is established, then that SA data is left intact. This is to prepare for newly generating an IPsec SA using that ISAKMP SA.

Step S37: The SA management unit 22 executes the abovementioned ISAKMP SA reestablishment subroutine. Thereby, an ISAKMP SA is reestablished even though an ISAKMP SA no longer exists with the other communications device due to Step S35. Accordingly, it is possible to handle a situation wherein the establishment of a new IPsec SA with the other communications device becomes necessary.

Step S38: If the target to be deleted by the received Delete Payload is an ISAKMP SA, then the SA management unit 22 judges, referencing the control table 22a, whether an IPsec SA exists that was established by that ISAKMP SA.

Step S39: If no IPsec SA exists that was established by the ISAKMP SA to be deleted, then the SA management unit 22 deletes from the control table 22a the SA data of the ISAKMP SA to be deleted. For example, the ID, the lifetime, and the status of the ISAKMP SA are deleted from the control table 22a. The ISAKMP SA is thereby disconnected.

Step S40: The SA management unit 22 executes the abovementioned ISAKMP SA reestablishment subroutine. Even if there is no longer an ISAKMP SA that exists with the other communications device due to the abovementioned Step S39, an ISAKMP SA is established with the other communications device by this subroutine. Accordingly, it is possible to handle a situation wherein the establishment of a new IPsec SA with the other communications device becomes necessary.

Step S41: If an IPsec SA exists that was established by the ISAKMP SA to be deleted, then the SA management unit 22, instead of deleting the SA data of that ISAKMP SA, updates its status to "cannot establish new IPsec SA." The SA data is not deleted because there is a communications device of an implementation mode that needs that ISAKMP SA to delete the IPsec SA established by that ISAKMP SA. In other words, by setting the status to "cannot establish new IPsec SA," it is possible to prevent the establishment of a new IPsec SA by that ISAKMP SA while enabling just the deletion of the IPsec SA already established. Accordingly, an inconsistency in the IPsec SA no longer occurs between communications devices mutually having an already established IPsec SA.

Step S42: The SA management unit 22 executes the previously discussed ISAKMP SA reestablishment subroutine. Because the status of the ISAKMP SA to be deleted was set to "cannot establish new IPsec SA" by Step S41, there is a possibility that there will no longer be an ISAKMP SA in an establishment completed state with the other communications device. Therefore, the ISAKMP SA that was established with the other communications device by executing this subroutine is maintained, and an IPsec SA is always kept in an establishable state.

By performing the above processing, the IPsec SA data is deleted in accordance with the Delete Payload of the IPsec SA that used the ISAKMP SA that satisfies the reception condition. Accordingly, it is possible, by the method of setting the reception condition, to suppress an occurrence of an inconsistency in the IPsec SA with the transmission side and receiving side communications devices. In addition, even if a Delete Payload of the ISAKMP SA is received, the continuous maintenance of an ISAKMP SA established with the other communications device enables the speedy reestablishment of an IPsec SA after deletion.

(2-4) IPsec SA Lifetime Expiration Processing

Figure 9:
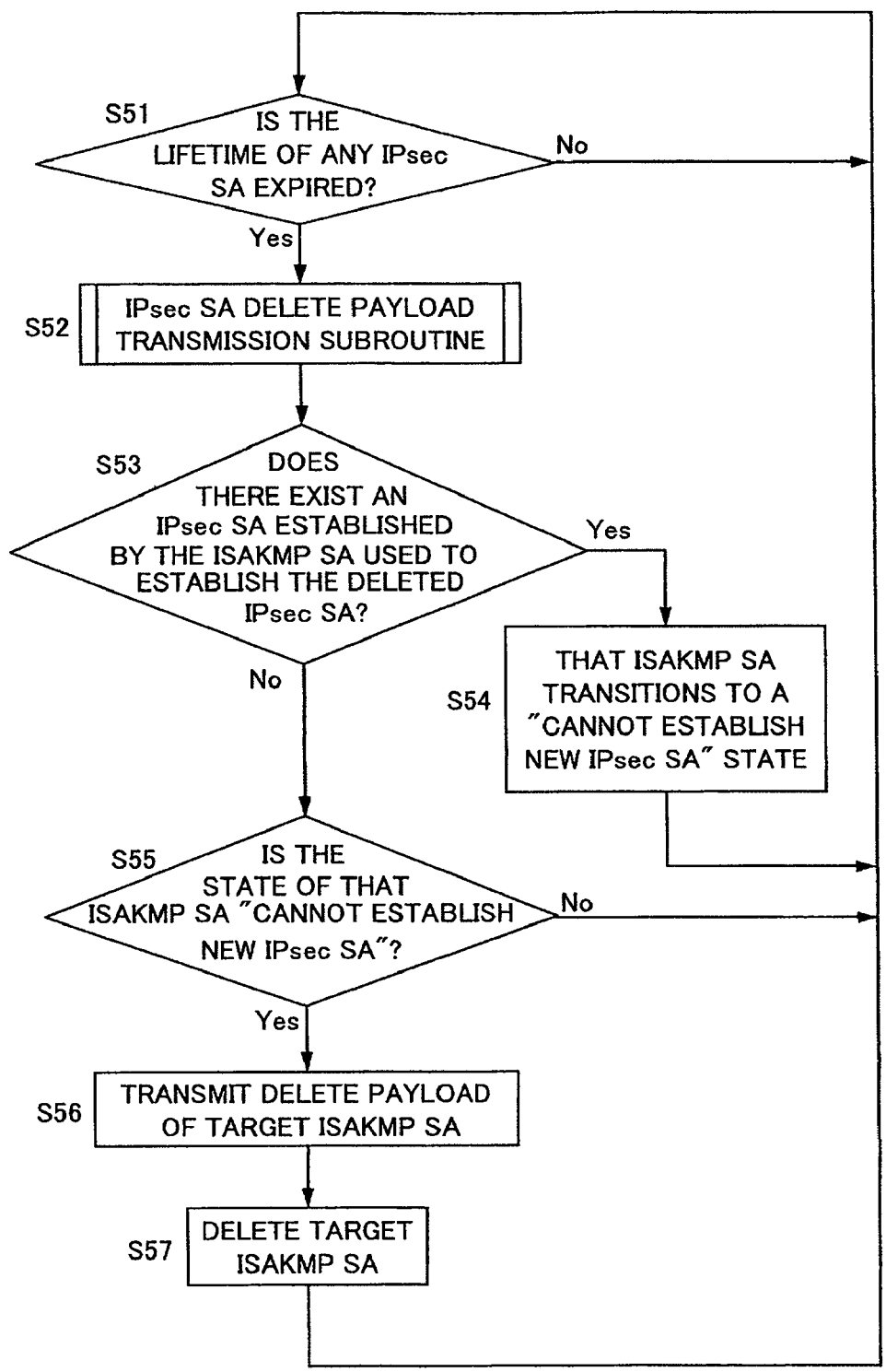
FIG. 9 is a flow chart that depicts one example of an IPsec SA lifetime expiration process.

FIG. 9 is a flow chart that depicts one example of the IPsec SA lifetime expiration processing executed by the SA management unit 22. This process is independent of other processes, and is executed in parallel with or between other processes. By performing this process, the IPsec SA whose lifetime has expired is deleted, and the SA data of the ISAKMP SA used to establish that EPsec SA is updated.

Step S51: The SA management unit 22 monitors whether the lifetime of any IPsec SA has expired by comparing the time of the internal clock in the communications device 10 with the IPsec SA expiration time in the control table 22a. Processing transitions to Step S52 if the lifetime of any IPsec SA expires.

Step S52: The SA management unit 22 executes the abovementioned IPsec SA Delete Payload transmission subroutine. Thereby, the ID and lifetime of the IPsec SA whose lifetime has expired are deleted from the control table 22a. Namely, the IPsec SA is disconnected.

Steps S53-S54: The SA management unit 22 judges whether there exists another IPsec SA that was established by the ISAKMP SA that was used to establish the IPsec SA to be deleted (S53). If one does exist, then the status of that ISAKMP SA is made to transition to the "cannot establish new IPsec SA" status (S54). This is because that ISAKMP SA may be needed to transmit and receive a Delete Payload of another IPsec SA. If another IPsec SA does not exist, then processing transitions to Step S55.

Step S55: The SA management unit 22 judges, referencing the control table 22a, whether the status of the ISAKMP SA used to establish the IPsec SA to be deleted is "cannot establish new IPsec SA." If the status of that ISAKMP SA is not "cannot establish new IPsec SA," i.e., if its status is "establishment completed," then that ISAKMP SA is left intact. This is because it is in a state wherein a new IPsec SA can immediately be established using that ISAKMP SA. If the status of that ISAKMP SA is "cannot establish new IPsec SA," then processing transitions to Step S56.

Step S56: The SA management unit 22 transmits, via the ISAKMP message processing unit 24 and the IP processing unit 40 to the other communications device, the Delete Payload of the ISAKMP SA that was used to establish the IPsec SA to be deleted and whose status is "cannot establish new IPsec SA." This is because it is not necessary to reserve this ISAKMP SA for the Delete Payload of such an IPsec SA because there does not exist an IPsec SA that was established using this ISAKMP SA.

Step S57: The SA management unit 22 deletes the ISAKMP SA subject to transmission of the Delete Payload in Step S56. Specifically, the ID, lifetime, and status of that ISAKMP SA are deleted from the control table 22a. The ISAKMP SA is thereby disconnected. Subsequently, processing returns once again to Step S51, and the previously discussed process is performed for another IPsec SA.

Furthermore, the IPsec SA is disconnected if the lifetime of the IPsec SA expires in the abovementioned process, but it is acceptable to further establish a new IPsec SA.

By performing the above process, the IPsec SA whose lifetime has expired is disconnected, and the ISAKMP SA is disconnected if the ISAKMP SA is no longer needed attendant with the disconnection of that IPsec SA, thereby achieving the effective utilization of the resources of the communications devices.

(2-5) ISAKMP SA Lifetime Expiration Processing

Figure 10:
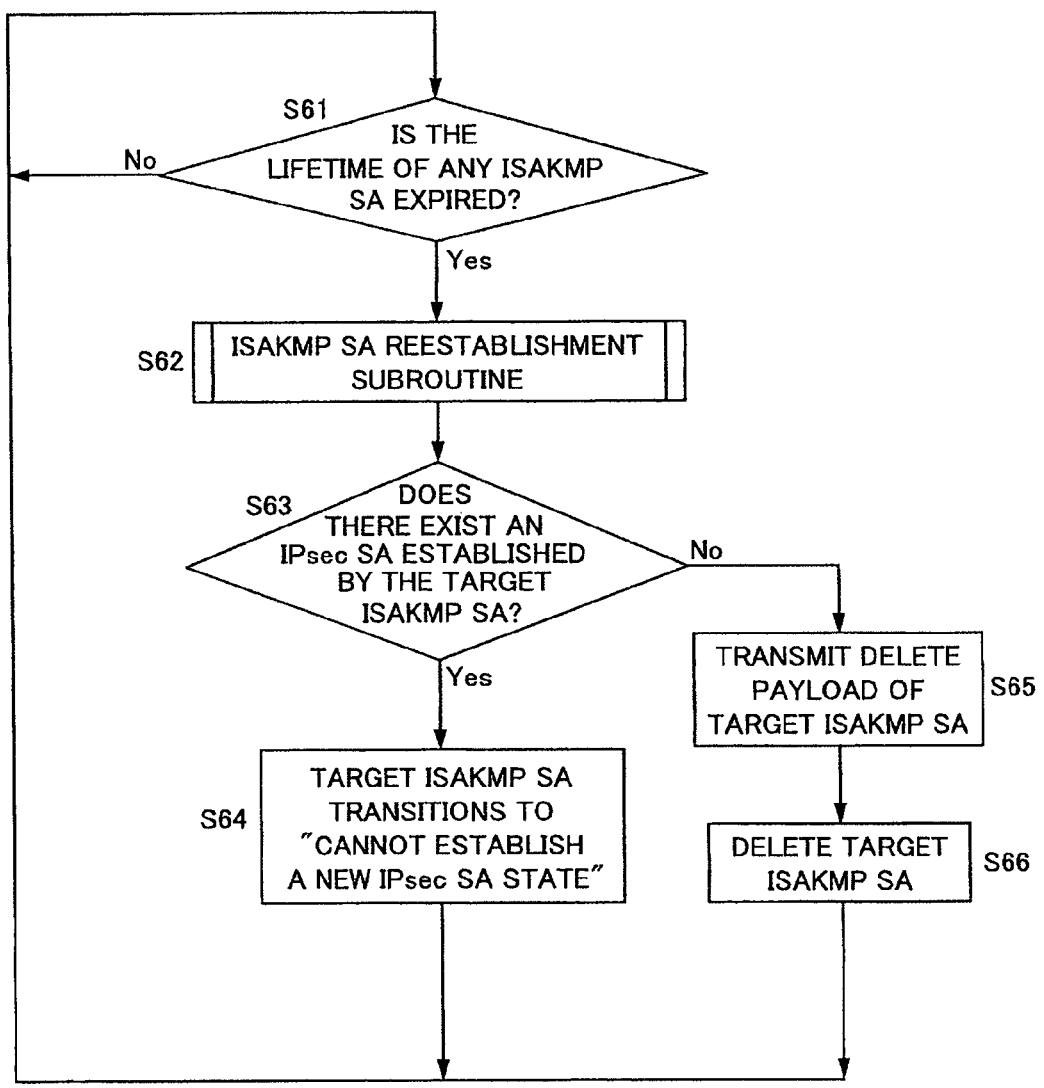
FIG. 10 is a flow chart that depicts one example of the flow of a ISAKMP SA lifetime expiration process.
Figure 11:
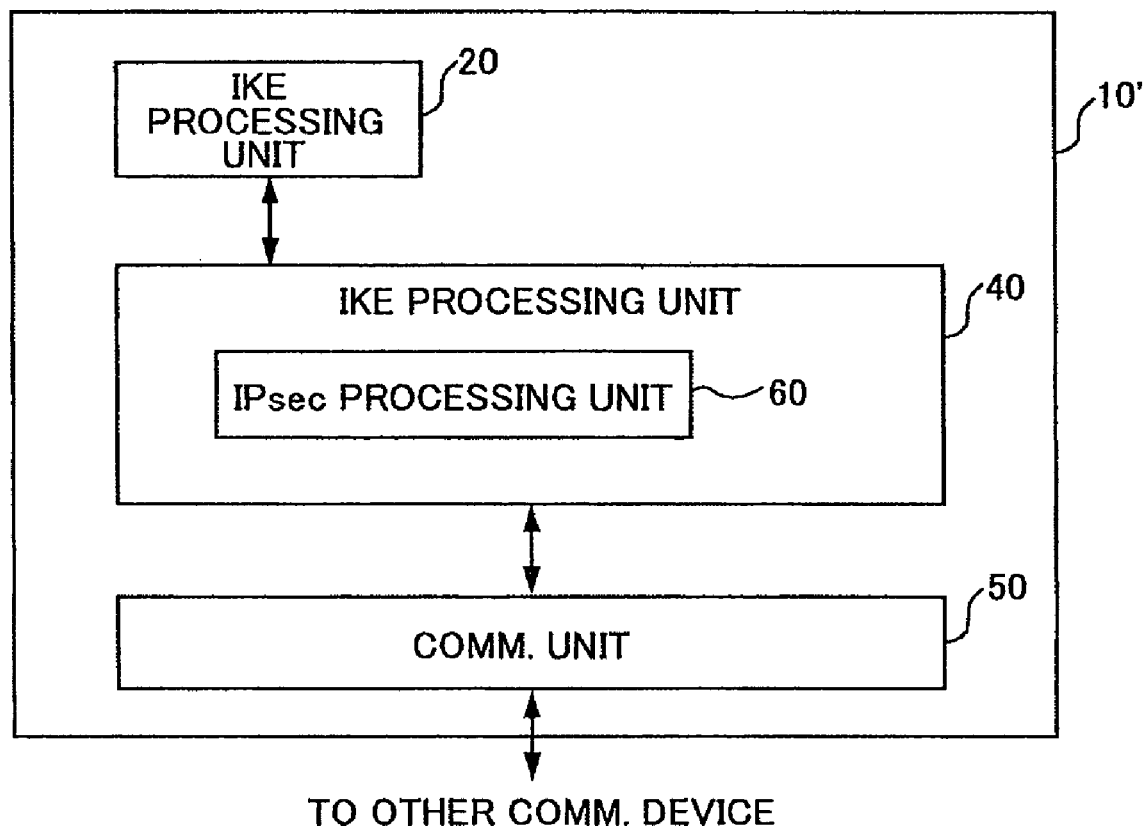
FIG. 11 is a functional configuration diagram of a communications device in another embodiment.

FIG. 10 is a flow chart that depicts one example of the flow of the ISAKMP SA lifetime expiration processing performed by the SA management unit 22. By performing this process, the data of an ISAKMP SA whose lifetime has expired is updated or deleted.

Step S61: The SA management unit 22 monitors whether the lifetime of any ISAKMP SA has expired by comparing the time of the internal clock in the communications device 10 with the ISAKMP SA expiration time in the control table 22a. If the lifetime of any ISAKMP SA expires, then processing transitions to Step S62.

Step S62: The SA management unit 22 executes the ISAKMP SA reestablishment subroutine, discussed earlier, prior to performing processing, which is discussed later, for the ISAKMP SA whose lifetime has expired. This is in order to maintain an ISAKMP SA established with the other communications device even if the ISAKMP SA whose lifetime will expire later is deleted.

Steps S63-S64: The SA management unit 22 judges, referencing the control table 22a, whether there exists with the other communications device an IPsec SA established by an ISAKMP SA whose lifetime has expired. If such an IPsec SA does exist, then the SA management unit 22 updates, without deleting the ISAKMP SA whose lifetime has expired, the status of that ISAKMP SA to "cannot establish new IPsec SA." This is to enable beforehand the transmission and reception of the Delete Payload of such an IPsec SA. It is acceptable to subsequently execute the ISAKMP SA reestablishment subroutine of the abovementioned Step S62.

Step S65: If there does not exist with the other communications device an IPsec SA established by the ISAKMP SA whose lifetime has expired, then the SA management unit 22 transmits to the other communications device the Delete Payload of the ISAKMP SA whose lifetime has expired. This is because, inasmuch as the lifetimes have expired and no corresponding IPsec SA therefore exists, there is no meaning to perpetuating such an ISAKMP SA.

Step S66: The SA management unit 22 deletes from the control table 22a the data of the ISAKMP SA whose lifetime has expired. Specifically, the ID, the lifetime, and the status of that ISAKMP SA is deleted from the control table 22a. The ISAKMP SA is thereby disconnected. It is acceptable to subsequently execute the ISAKMP SA reestablishment subroutine of the abovementioned Step S62.

By performing the above process, deleting or updating the status of an ISAKMP SA whose lifetime has expired enables the Delete Payload of a related IPsec SA to be set to a transmittable state, even after the ISAKMP SA expiration time. Namely, the Delete Payload of an IPsec SA established using a certain ISAKMP SA can be transmitted using that ISAKMP SA even after that ISAKMP SA expiration time. Accordingly, inconsistencies in IPsec SAs no longer occur even if a communications device has an implementation mode that needs to transmit and receive a Delete Payload of an ISAKMP SA used to establish an IPsec SA.

(2-6) Other Processes

Furthermore, outside of the processes discussed above, the IKE processing unit 20 performs various SA establishment and updating processes in accordance with the definitions of RFCs.

For example, IPsec SA establishment is executed 1) at the time of first communication, 2) when the lifetime of an IPsec SA runs out, and 3) when there does not exist an IPsec SA applicable to the desired communication with the other communications device after an ISAKMP SA was already established.

Specifically, if IPsec SA establishment has been instructed and an ISAKMP SA in the "establishment completed state" exists with the other communications device, then the SA management unit 22 instructs the SA establishment unit 23 to establish an IPsec SA using that ISAKMP SA. Conversely, if an ISAKMP SA in the "establishment completed state" does not exist, then the SA management unit 22 instructs the SA establishment unit 23 to establish a new ISAKMP SA. The SA management unit 22 instructs the SA establishment unit 23 to establish an IPsec SA using the newly established ISAKMP SA. At this time, an ISAKMP SA in the "cannot establish new IPsec SA state" is not used. The updating of the IPsec SA is performed when the lifetime of the IPsec SA has run out, and is performed the same as the establishment of an IPsec SA.

In addition, for example, the SA management unit 22 of the IKE processing unit 20 performs update processing of the IPsec SA and the ISAKMP SA. The SA management unit 22 monitors whether the expiration of an SA has been reached, and instructs the SA establishment unit 23 to perform the establishment or updating process for an SA whose expiration has been reached. In addition, the SA management unit 22 updates the SA data in the control table 22a. It is acceptable to execute this process in parallel with other processes, or to periodically execute this process between other processes.

In addition, for example, before an application starts communication, e.g., immediately before the establishment of a TCP connection, the IKE processing unit 20 can perform the delete processing for the IPsec SA for which that TCP connection is applicable. Thereby, it is possible to force the execution of IPsec SA establishment processing. However, if this method is executed for a situation in which there are a plurality of applications and the communications of all applications share one IPsec SA, then it is not preferable because it will hinder the communications of other applications. However, if the condition data for establishing an IPsec SA is independent for each application, then this method is useful.

The communications device of the present embodiment transmits and receives an IPsec SA Delete Payload using an ISAKMP SA that satisfies a prescribed transmission condition and reception condition. It can especially prevent the arising of a situation in which an IPsec SA is deleted on only one side if at least: the transmitting side communications device transmits a Delete Payload using all ISAKMP SAs that exist between the communications devices, or the receiving side communications device accepts a Delete Payload by any ISAKMP SA of that type. Accordingly, it is possible to prevent an inconsistency in the Ipsec SA among communications devices.

Furthermore, as long as there exists an IPsec SA established using an ISAKMP SA, that ISAKMP SA is set, without completely deleting it, to a status that is capable of transmitting the Delete Payload of the IPsec SA by that ISAKMP SA. For example, even if the lifetime of an ISAKMP SA runs out, the Delete Payload of an IPsec SA established by that ISAKMP SA can be transmitted by that ISAKMP SA. Accordingly, the Delete Payload can be reliably transmitted or received even with a communications device capable of transmitting or receiving a Delete Payload only by an ISAKMP SA that was used to establish the IPsec SA.

Moreover, because an ISAKMP SA that was established between the communications devices is continuously maintained, a new IPsec SA can be quickly established, as needed, after the deletion of the IPsec SA.

Second Embodiment

Figure 12:
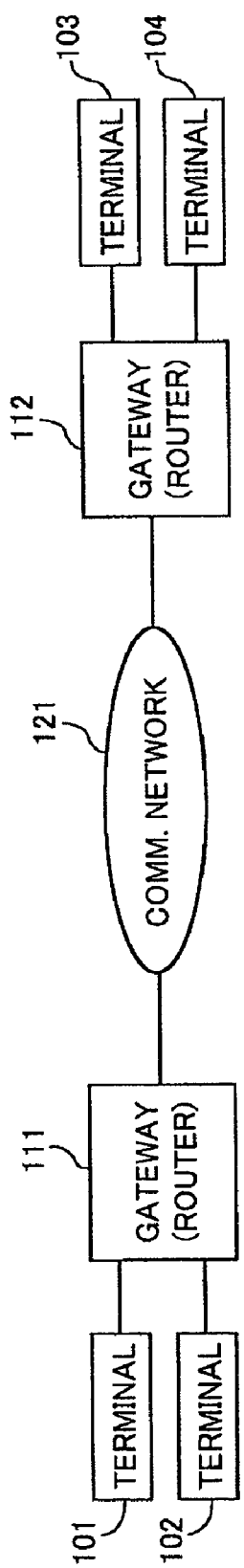
FIG. 12 is an example of a network configuration using conventional communications devices.
Figure 13:
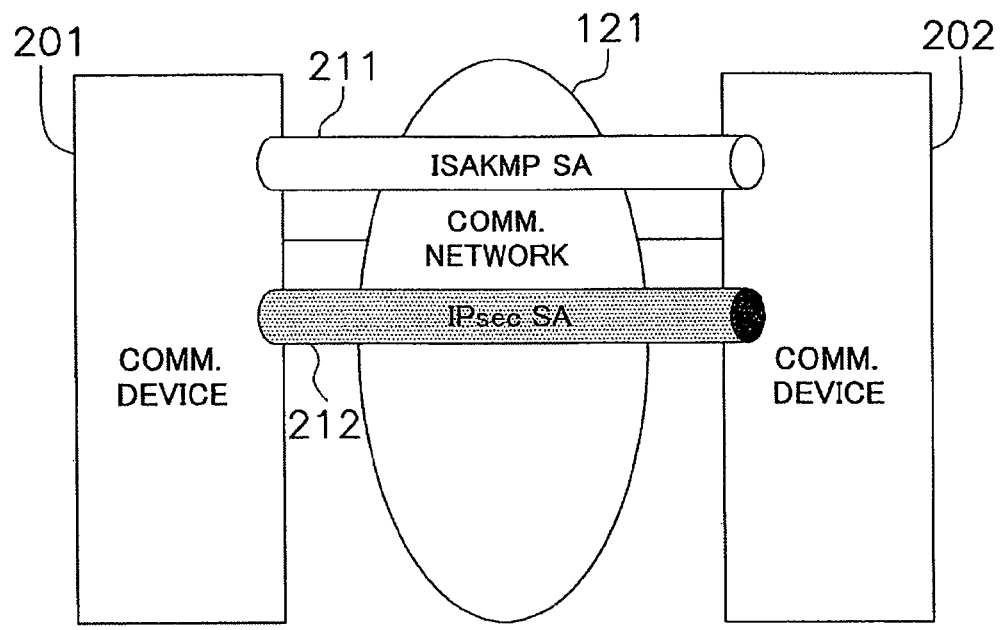
FIG. 13 is an explanatory diagram that depicts the status of an SA for performing encrypted communications (Ipsec communications) based on IPsec.
Figure 14:
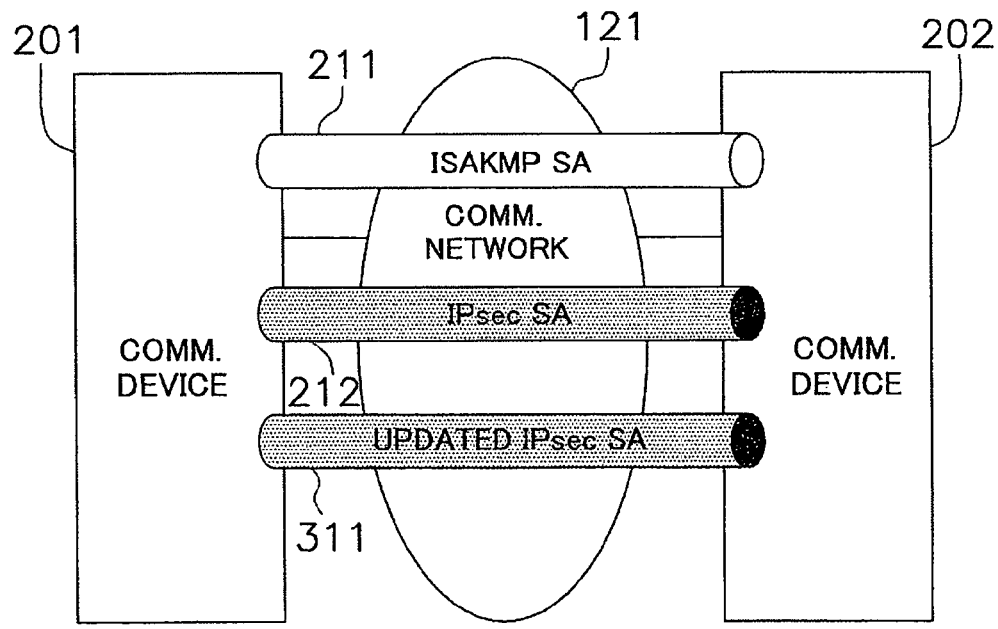
FIG. 14 is an explanatory diagram that depicts a situation in which a new IPsec SA for modification has been established by a method that performs updating prior to the expiration of a lifetime.

FIG. 12 is a block diagram that depicts the functional configuration of a communications device according to the second embodiment of the present invention. In FIG. 12, constituent elements that are the same as those in FIG. 2 are assigned the same symbol, and their explanation is omitted. In FIG. 12, a communications device 10' does not have an application unit. In the first embodiment, encrypted communications was applied to the data from the application unit; however, in the present embodiment, encrypted communications is applied if an IP packet received by the communications unit 50 is retransmitted (forwarded) to another communications device. Even in this situation, the previously discussed processing is performed in the same manner.

Other Embodiments (A) In the abovementioned embodiment, as long as at least one IPsec SA exists that was established using a certain ISAKMP SA, the SA data of that ISAKMP SA is not completely deleted from the control table 22a. Instead, the status of that ISAKMP SA is modified to "cannot establish new IPsec SA."

However, if an application or a user instructs the deletion of a certain ISAKMP SA, then the SA data of that ISAKMP SA can be deleted from the control table 22a even if there exists an IPsec SA that was established using that ISAKMP SA. That is because it is conceivable that an instruction from an application or a user to delete an ISAKMP SA might include an instruction to delete an IPsec SA relevant to that ISAKMP SA.

(B) In the abovementioned embodiment, the SA is managed by registering and deleting the SA identifier respectively to and from the control table 22a. However, a control mode is also possible wherein there are a prescribed number of entries prepared in advance in the control table 22a, each entry is identified by an identifier, and data related to the SA is written in those entries. In that situation, the deletion of an SA identifier means the deletion of data relevant to that identifier from the entry wherein the data related to that SA is written.

(C) The scope of the present invention includes a program for causing a computer to execute the previously discussed method, and computer readable recording medium whereon that program is recorded. Here, examples of recording medium include a computer readable/writable flexible disc, a hard disc, semiconductor memory, a CD-ROM, a DVD, a magneto-optic disk (MO), and others.

The communications device according to the present invention can be used in encrypted communications that uses IPsec. Examples of such a communications device include consumer electronics having an IP communications function, and a gateway having an encrypted communications function.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A communications device that performs encrypted communications by establishing, based on IPsec (IP security protocol) and IKE (Internet Key Exchange), an ISAKMP (Internet Security Association and Key Management Protocol) SA (Security Association) and an IPsec SA, comprising:

a managing unit that stores an identifier of another communications device with which said encrypted communications is performed; an identifier of an IPsec SA established with that other communications device; and an identifier of an ISAKMP SA established with that other communications device;

a judging unit that, from among ISAKMP SAs whose identifiers are stored by said managing unit, specifies one or a plurality of ISAKMP SAs established with the other communications device and satisfying an IPsec SA Delete Payload transmission condition stored by said managing unit;

a transmitting unit that uses the ISAKMP SAs specified by said judging unit to transmit a Delete Payload of the IPsec SA; and a deleting unit that deletes from said managing unit the identifier of the IPsec SA to be deleted by the Delete Payload, wherein, the transmission condition is that the Delete Payload of the IPsec SA should be transmitted using all the ISAKMP SAs established with the other communications device.

2. The communications device as recited in claim 1, further comprising:

a condition managing unit that associates prescribed data that identifies the other communications device's characteristics stored in said managing unit with a second IPsec SA Delete Payload transmission condition, that has been set for the other communications device, and that stores them; wherein, said managing unit associates the prescribed data that identifies the characteristics of the other communications device with the identifier of the other communications device, and further stores them;

said judging unit reads out from said condition managing unit the second transmission condition associated with the prescribed data corresponding to the other communications device for which the IPsec SA is established, and specifies one or a plurality of ISAKMP SAs that meets the read out second transmission condition; and said transmitting unit uses the ISAKMP SAs specified by said judging unit based on the second transmission condition and transmits the Delete Payload of the IPsec SA.

3. The communications device as recited in claim 2, wherein the prescribed data that identifies the characteristics of the other communications device is an identifier of the manufacturer of the other communications device;

said condition managing unit associates the identifier of the manufacturer with the second transmission condition, and stores them; and said judging unit reads out from said condition managing unit the second transmission condition associated with the identifier of the manufacturer corresponding to the IPsec SA, and specifies one or a plurality of ISAKMP SAs that meets the read out second transmission condition.

4. The communications device as recited in claim 1, wherein said managing unit further stores the association between the ISAKMP SA and the IPsec SA established by that ISAKMP SA;

said judging unit judges whether there is an IPsec SA that is another IPsec SA outside of the IPsec SA to be deleted by the Delete Payload, and that is established by the ISAKMP SA used to establish the IPsec SA to be deleted; and said deleting unit deletes from said managing unit the identifier of the ISAKMP SA if said judging unit has judged that there is no other IPsec SA established by the ISAKMP SA.

5. The communications device as recited in claim 4, wherein said managing unit associates the IPsec SA expiration time with the IPsec SA identifier, and further stores them;

said judging unit further monitors whether there is an IPsec SA, whose identifier is stored in said managing unit, that has exceeded its expiration time, and, if there is an IPsec SA whose expiration time has been exceeded, then judges whether there is another IPsec SA established by the ISAKMP SA used to establish that IPsec SA; and said deleting unit deletes from said managing unit the identifier of the ISAKMP SA if said judging unit has judged that there is no other IPsec SA established by the ISAKMP SA.

6. The communications device as recited in claim 4, wherein said managing unit further stores the ISAKMP SA expiration time associated with the identifier of the ISAKMP SA;

said judging unit judges whether there is no other IPsec SA established by the ISAKMP SA and whether the ISAKMP SA expiration time has been exceeded; and if there is no other IPsec SA established by the ISAKMP SA and said judging unit judges that the expiration time of the ISAKMP SA has been exceeded, then said deleting unit deletes from said managing unit the identifier of the ISAKMP SA.

7. The communications device as recited in claim 4, wherein said judging unit judges whether an ISAKMP SA other than the ISAKMP SA to be deleted is established with the other communications device;

further comprising:

a reestablishing unit that establishes a new ISAKMP SA in accordance with the judgment results of said judging unit.

8. The communications device as recited in claim 7, wherein prior to transmitting the IPsec SA Delete Payload by said transmitting unit or in response to the transmission of the Delete Payload by said transmitting unit, said reestablishing unit judges whether an ISAKMP SA other than the ISAKMP SA is established with the other communications device, and establishes a new ISAKMP SA in accordance with the judgment results.

9. A communications method executed by a communications device that performs encrypted communications by establishing, based on IPsec (IP security protocol) and IKE (Internet Key Exchange), an ISAKMP (Internet Security Association and Key Management Protocol) SA (Security Association) and an IPsec SA, the method comprising the steps of:

storing an identifier of another communications device with which the encrypted communications is performed; an identifier of an IPsec SA established with that other communications device; and an identifier of an ISAKMP SA established with that other communications device;

specifying, from among ISAKMP SAs whose identifiers are stored in said storing step, one or a plurality of ISAKMP SAs with the other communications device and that satisfies the IPsec SA Delete Payload transmission condition stored in said storing step;

transmitting a Delete Payload of the IPsec SA by using the ISAKMP SAs specified by said specifying step;

deleting from the storage object in the storing step the identifier of the IPsec SA to be deleted by the Delete Payload, and wherein, said transmission condition is that the Delete Payload of the IPsec SA should be transmitted using all the ISAKMP IP SAs established with the other communications device.

10. A communications device that performs encrypted communications by establishing, based on IPsec (IP security protocol) and IKE (Internet Key Exchange), an ISAKMP (Internet Security Association and Key Management Protocol) SA (Security Association) and an IPsec SA, comprising:

a managing unit that stores an identifier of another communications device with which the encrypted communications is performed; an identifier of an IPsec SA established with that other communications device; and an identifier of an ISAKMP SA established with that other communications device;

a receiving unit that receives a Delete Payload of the IPsec SA from the other communications device using an arbitrary ISAKMP SA;

a judging unit that judges whether the ISAKMP SA satisfies a reception condition of the Delete Payload of the IPsec SA; and a deleting unit that, if said judging unit judges that the reception condition is satisfied, deletes the IPsec SA identifier from said managing unit, wherein, the reception condition is that the Delete Payload of the IPsec SA should be received using any one of the ISAKMP IP SAs established with the other communications device.

11. The communications device as recited in claim 10 further comprising:

a condition managing unit that associates prescribed data that identifies the other communications device's characteristics stored in said managing unit with a second IPsec SA Delete Payload reception condition; that has been set for the other communications device, and that stores them; wherein, said managing unit associates the prescribed data that identifies the characteristics of the other communications device with the identifier of the other communications device, and further stores them;

said judging unit reads out from said condition managing unit the second reception condition associated with the prescribed data corresponding to the other communications device for which the IPsec SA is established, and judges whether the ISAKMP SA used to receive the Delete Payload satisfies the read out second reception condition; and said deleting unit deletes the IPsec SA identifier from said managing unit if said judging unit judges that the second reception condition is satisfied.

12. The communications device as recited in claim 11, the prescribed data that identifies the characteristics of the other communications device is an identifier of the manufacturer of the other communications device;

said condition managing unit associates the identifier of the manufacturer with the second reception condition, and stores them; and said judging unit reads out from said condition managing unit second the reception condition associated with the identifier of the manufacturer corresponding to the IPsec SA, and judges whether the ISAKMP SA that was used to receive the Delete Payload satisfies the read out second reception condition.

13. The communications device as recited in claim 10, wherein said managing unit further stores the association between the ISAKMP SA and the IPsec SA established by that ISAKMP SA;

said judging unit judges whether there is an IPsec SA that is another IPsec SA outside of the IPsec SA to be deleted by the Delete Payload, and that is established by the ISAKMP SA used to establish the IPsec SA to be deleted; and said deleting unit deletes from said managing unit the identifier of the ISAKMP SA if said judging unit has judged that there is no other IPsec SA established by the ISAKMP SA.

14. The communications device as recited in claim 13, wherein said managing unit associates the IPsec SA expiration time with the IPsec SA identifier, and further stores them;

said judging unit further monitors whether there is an IPsec SA, whose identifier is stored in said managing unit, that has exceeded its expiration time, and, if there is an IPsec SA whose expiration time has been exceeded, then judges whether there is another IPsec SA established by the ISAKMP SA used to establish that IPsec SA; and said deleting unit deletes from said managing unit the identifier of the ISAKMP SA if said judging unit has judged that there is no other IPsec SA established by the ISAKMP SA.

15. The communications device as recited in claim 13, wherein said managing unit further stores the ISAKMP SA expiration time associated with the identifier of the ISAKMP SA;

said judging unit judges whether there is no other IPsec SA established by the ISAKMP SA and whether the ISAKMP SA expiration time has been exceeded; and if there is no other IPsec SA established by the ISAKMP SA and said judging unit judges that the expiration time of the ISAKMP SA has been exceeded, then said deleting unit deletes from said managing unit the identifier of the ISAKMP SA.

16. The communications device as recited in claim 13, wherein said judging unit judges whether an ISAKMP SA other than the ISAKMP SA to be deleted is established with the other communications device;

further comprising:

a reestablishing unit that establishes a new ISAKMP SA in accordance with the judgment results of said judging unit.

17. The communications device as recited in claim 16, wherein in response to the reception of the IPsec SA Delete Payload by said receiving unit, said reestablishing unit judges whether an ISAKMP SA other than the ISAKMP SA is established with the other communications device, and establishes a new ISAKMP SA in accordance with the judgment results.

18. A communications method executed by a communications device that performs encrypted communications by establishing, based on IPsec (IP security protocol) and IKE (Internet Key Exchange), an ISAKMP (Internet Security Association and Key Management Protocol) SA (Security Association) and an IPsec SA, the method comprising the steps of:

storing an identifier of another communications device with which the encrypted communications is performed; an identifier of an IPsec SA established with that other communications device; and an identifier of an ISAKMP SA established with that other communications device;

receiving a Delete Payload of the IPsec SA from the other communications device using an arbitrary ISAKMP SA;

judging whether the ISAKMP SA satisfies the reception condition of the Delete Payload of the IPsec SA; and if the reception condition is satisfied in said judging step, deleting the IPsec SA identifier from the storage target in said storing, wherein, the reception condition is that the Delete Payload of the IPsec SA should be received using any one of ISAKMP SAs established with the other communications device.

19. A communications system comprising a first communications device and a second communications device that perform encrypted communications by establishing, based on IPsec (IP security protocol) and IKE (Internet Key Exchange), an ISAKMP (Internet Security Association and Key Management Protocol) SA (Security Association) and an IPsec SA:

said first communications device, comprising:
a first managing unit that stores an identifier of said second communications device, which is the other of the encrypted communications; an identifier of an IPsec SA established with said second communications device; and an identifier of an ISAKMP SA established with said second communications device;
a first judging unit that, from among ISAKMP SAs whose identifiers are stored by said first managing unit, specifies one or a plurality of ISAKMP SAs established with said second communications device and satisfying an IPsec SA Delete Payload transmission condition stored by said first managing unit;
a transmitting unit that uses the of ISAKMP SAs specified by said first judging unit to transmit a Delete Payload of the IPsec SA; and
a first deleting unit that deletes from said first managing unit the identifier of the IPsec SA to be deleted by the Delete Payload; and said second communications device, comprising:
a second managing unit that stores an identifier of said first communications device, which is the other of the encrypted communications; an identifier of an IPsec SA established with said first communications device; and an identifier of an ISAKMP SA established with said first communications device;
a receiving unit that receives a Delete Payload of the IPsec SA from said first communications device using an arbitrary ISAKMP SA;
a second judging unit that judges whether the ISAKMP SA satisfies the reception condition of the Delete Payload of the IPsec SA; and
a second deleting unit that, if said second judging unit judges that the reception condition is satisfied, deletes the IPsec SA identifier from said second managing unit, said communications system being operable with either one of the transmission condition of said first communications device and the reception condition of said second communications device, wherein, the transmission condition of said first communications device is that the Delete Payload of the IPsec SA should be transmitted using all the ISAKMP SAs established with said second communications device; and
the reception condition of said second communications device is that the Delete Payload of the IPsec SA should be received using any one of the ISAKMP SAs established with said first communications device.

20. The communications device as recited in claim 5, wherein said managing unit further stores the ISAKMP SA expiration time associated with the identifier of the ISAKMP SA;
said judging unit judges whether there is no other IPsec SA established by the ISAKMP SA and whether the ISAKMP SA expiration time has been exceeded; and
if there is no other IPsec SA established by the ISAKMP SA and said judging unit judges that the expiration time of the ISAKMP SA has been exceeded, then said deleting unit deletes from said managing unit the identifier of the ISAKMP SA.

21. The communications device as recited in claim 14, wherein said managing unit further stores the ISAKMP SA expiration time associated with the identifier of the ISAKMP SA;
said judging unit judges whether there is no other IPsec SA established by the ISAKMP SA and whether the ISAKMP SA expiration time has been exceeded; and
if there is no other IPsec SA established by the ISAKMP SA and said judging unit judges that the expiration time of the ISAKMP SA has been exceeded, then said deleting unit deletes from said managing unit the identifier of the ISAKMP SA.

* * * * *

UNITED STATES PATENT AND TRADEMARK OFFICE
CERTIFICATE OF CORRECTION

PATENT NO. : 7,558,956 B2
APPLICATION NO. : 11/049686
DATED : July 7, 2009
INVENTOR(S) : Atsuhiro Tsuji et al.

It is certified that error appears in the above-identified patent and that said Letters Patent is hereby corrected as shown below:

IN THE CLAIMS

In column 28, claim 9, line 51, please insert --that is established-- between "ISAKMP SAs" and "with the other".

In column 29, claim 10, line 18, please delete the word "IP" between "ISAKMP" and "SAs".

Signed and Sealed this

Nineteenth Day of January, 2010

David J. Kappos
*Director of the United States Patent and Trademark Office*